(12) United States Patent
Droz et al.

(10) Patent No.: US 11,808,887 B2
(45) Date of Patent: Nov. 7, 2023

(54) METHODS AND SYSTEMS FOR MAPPING RETROREFLECTORS

(71) Applicant: Waymo LLC, Mountain View, CA (US)

(72) Inventors: Pierre-Yves Droz, Los Altos, CA (US); Caner Onal, Palo Alto, CA (US); Michael Marx, Mountain View, CA (US); Blaise Gassend, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 1237 days.

(21) Appl. No.: 16/272,258

(22) Filed: Feb. 11, 2019

(65) Prior Publication Data

US 2020/0141716 A1 May 7, 2020

Related U.S. Application Data

(60) Provisional application No. 62/755,289, filed on Nov. 2, 2018.

(51) Int. Cl.
*G01S 7/481* (2006.01)
*G01S 17/04* (2020.01)
(Continued)

(52) U.S. Cl.
CPC ............ *G01S 7/4817* (2013.01); *G01S 7/483* (2013.01); *G01S 7/487* (2013.01); *G01S 7/4815* (2013.01);
(Continued)

(58) Field of Classification Search
CPC ..... G01B 9/02014; G01S 17/10; G01S 17/89; G01S 17/00; G01S 7/483; G01S 7/487;
(Continued)

(56) References Cited

U.S. PATENT DOCUMENTS

RE46,672 E    1/2018  Hall
10,061,019 B1 8/2018  Campbell et al.
(Continued)

FOREIGN PATENT DOCUMENTS

CA       3100215 A1  * 11/2019
CN     105579831 A   *  5/2016
(Continued)

OTHER PUBLICATIONS

Machine Translation of RU 2616653 C2 (Year: 2017).*
(Continued)

*Primary Examiner* — Yuqing Xiao
*Assistant Examiner* — Brian Zawacki
(74) *Attorney, Agent, or Firm* — McDonnell Boehnen Hulbert & Berghoff LLP

(57) ABSTRACT

One example method involves a light detection and ranging (LIDAR) device focusing light from a target region in a scene for receipt by a detector. The method also involves emitting a primary light pulse. The method also involves directing, via one or more optical elements, the primary light pulse toward the target region. The primary light pulse illuminates the target region according to a primary light intensity of the primary light pulse. The method also involves emitting a secondary light pulse. At least a portion of the secondary light pulse illuminates the target region according to a secondary light intensity of the secondary light pulse. The secondary light intensity is less than the primary light intensity.

20 Claims, 22 Drawing Sheets

(51) Int. Cl.
    *G01S 7/483*     (2006.01)
    *G01S 7/487*     (2006.01)
    *G01S 17/10*     (2020.01)
    *G01S 17/89*     (2020.01)
    *G06V 10/60*     (2022.01)
    *G06V 10/145*     (2022.01)
    *G06V 20/00*     (2022.01)
    *G06F 18/22*     (2023.01)

(52) U.S. Cl.
    CPC ............ *G01S 7/4873* (2013.01); *G01S 17/04* (2020.01); *G01S 17/10* (2013.01); *G01S 17/89* (2013.01); *G06F 18/22* (2023.01); *G06V 10/145* (2022.01); *G06V 10/60* (2022.01); *G06V 20/00* (2022.01)

(58) Field of Classification Search
    CPC ...... G01S 7/4873; G06K 9/6201; G06K 9/00; G06V 10/759; G06V 10/75; G06V 30/19007; G06V 10/10; G06V 10/20; G06V 30/1908
    USPC ................................................ 356/5.01, 4.06
    See application file for complete search history.

(56) References Cited

U.S. PATENT DOCUMENTS

| | | |
|---|---|---|
| 2002/0071126 A1 | 6/2002 | Shirai et al. |
| 2004/0135992 A1* | 7/2004 | Munro .................... G01S 17/10 356/4.01 |
| 2007/0076189 A1 | 4/2007 | Kumagai et al. |
| 2012/0038903 A1 | 2/2012 | Weimer et al. |
| 2015/0355327 A1* | 12/2015 | Goodwin .............. G01S 7/4812 359/198.1 |
| 2016/0245920 A1 | 8/2016 | Boufounos et al. |
| 2016/0259038 A1 | 9/2016 | Ratterath et al. |
| 2016/0356881 A1 | 12/2016 | Retterath et al. |
| 2016/0356890 A1 | 12/2016 | Fried et al. |
| 2017/0269197 A1 | 9/2017 | Hall et al. |
| 2018/0011174 A1 | 1/2018 | Miles et al. |
| 2018/0113200 A1* | 4/2018 | Steinberg ................. B60Q 1/26 |
| 2018/0136337 A1 | 5/2018 | Zohar et al. |
| 2018/0284237 A1 | 10/2018 | Campbell et al. |
| 2018/0284244 A1 | 10/2018 | Russell et al. |
| 2019/0004177 A1* | 1/2019 | Shand ................... G01S 17/931 |
| 2019/0056497 A1* | 2/2019 | Pacala ................... G01S 7/4863 |
| 2020/0025923 A1* | 1/2020 | Eichenholz ............. G01S 17/10 |

FOREIGN PATENT DOCUMENTS

| | | | | |
|---|---|---|---|---|
| CN | 111868560 A | * | 10/2020 | |
| EP | 2395368 A1 | * | 12/2011 | |
| EP | 3786668 A1 | * | 3/2021 | |
| JP | H06-242224 A | | 9/1994 | |
| JP | 2000-314775 A | | 11/2000 | |
| JP | 2002-181937 A | | 6/2002 | |
| JP | 5747700 B2 | | 7/2015 | |
| RU | 2616653 C2 | * | 4/2017 | |
| WO | WO-2006077588 A2 | * | 7/2006 | ............. G01S 13/18 |
| WO | WO-2018127789 A1 | * | 7/2018 | |

OTHER PUBLICATIONS

Machine Translation of CN 111868560 A (Year: 2020).*
Machine Translation of CN 105579831 A (Year: 2016).*
Machine Translation of EP 2395368 A1 (Year: 2011).*
International Search Report and Written Opinion dated Aug. 14, 2020 issued in connection with International Application No. PCT/US2019/058260, filed on Oct. 28, 2019, 10 pages.

* cited by examiner

METHODS AND SYSTEMS FOR MAPPING RETROREFLECTORS

CROSS-REFERENCE TO RELATED APPLICATION

This application claims priority to U.S. Provisional Patent Application No. 62/755,289 filed on Nov. 2, 2018, the entirety of which is incorporated herein by reference.

BACKGROUND

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a method is provided. The method involves focusing, by a light detection and ranging (LIDAR) device, light from a target region in a scene for receipt by a detector. The method also involves transmitting a plurality of light pulses toward the scene. Transmitting the plurality of light pulses comprises emitting a primary light pulse, and directing the primary light pulse toward the target region via one or more optical elements. The primary light pulse illuminates the target region according to a primary light intensity of the primary light pulse. Transmitting the plurality of light pulses also comprises emitting a secondary light pulse. At least a portion of the secondary light pulse illuminates the target region according to a secondary light intensity of the secondary light pulse. The secondary light intensity is less than the primary light intensity.

In another example, a light detection and ranging (LIDAR) device is provided. The LIDAR device includes a detector arranged to intercept light, focused by the LIDAR device, from a target region in a scene. The LIDAR device also includes a primary emitter configured to emit a primary light pulse. The LIDAR device also includes one or more optical elements arranged to direct the primary light pulse toward the target region. The primary light pulse illuminates the target region according to a primary light intensity of the primary light pulse. The LIDAR device also includes a secondary emitter configured to emit a secondary light pulse. At least a portion of the secondary light pulse illuminates the target region according to a secondary light intensity of the secondary light pulse. The secondary light intensity is less than the primary intensity.

In yet another example, a light detection and ranging (LIDAR) device is provided. The LIDAR device includes a receiver arranged to intercept light from a target region in a scene. The LIDAR device also includes a transmitter configured to transmit a sequence of light pulses toward the target region. The sequence of light pulses includes one or more primary light pulses and one or more secondary light pulses. Respective light intensities of the one or more primary light pulses are greater than a primary threshold. Respective light intensities of the one or more secondary light pulses are less than a secondary threshold. The primary threshold is greater than the secondary threshold.

In still another example, a system is provided. The system comprises means for focusing, by a light detection and ranging (LIDAR) device, light from a target region in a scene for receipt by a detector. The system also comprises means for transmitting a plurality of light pulses toward the scene. Transmitting the plurality of light pulses comprises emitting a primary light pulse, and directing the primary light pulse toward the target region via one or more optical elements. The primary light pulse illuminates the target region according to a primary light intensity of the primary light pulse. Transmitting the plurality of light pulses also comprises emitting a secondary light pulse. At least a portion of the secondary light pulse illuminates the target region according to a secondary light intensity of the secondary light pulse. The secondary light intensity is less than the primary light intensity.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
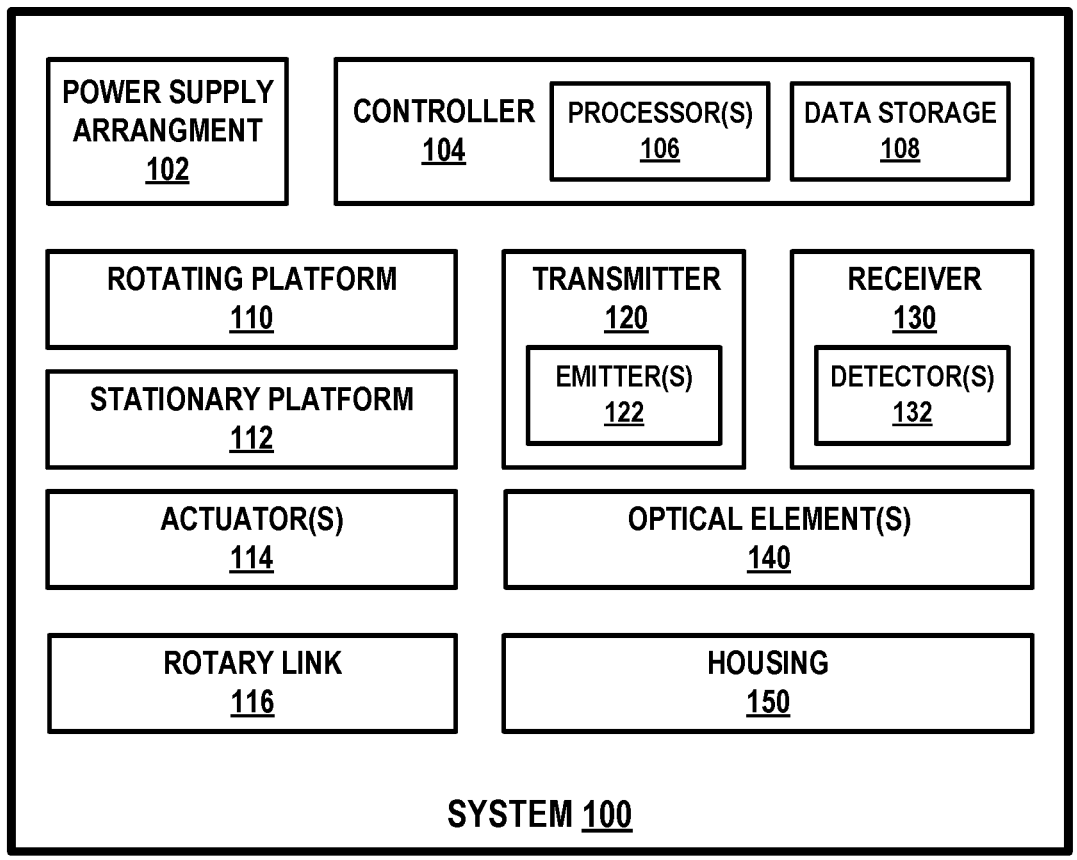
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. OVERVIEW

Within examples, an active sensing system (e.g., LIDAR, etc.) may transmit a plurality of signals toward a scene, and intercept reflected portions of the transmitted signals returning from the scene.

In one example, a LIDAR device may scan a scene by emitting light pulses toward the scene and detecting reflections of the emitted light pulses returning from the scene. For instance, a reflective surface in the scene may reflect, absorb, and/or scatter an emitted light pulse incident thereon. The LIDAR device may then detect at least a portion of the reflected light pulse that returns to the LIDAR device from the reflective surface.

In some scenarios, the reflective surface may reflect the emitted light pulse (or a portion thereof) as a diverging reflected light beam that propagates away from the reflective surface. Due to the divergence of the reflected light beam, the amount of energy (e.g., number of photons, etc.) in a portion of the reflected light beam that eventually arrives at a detector of the LIDAR device may decrease as the distance between the LIDAR device and the reflective surface increases.

In some examples, the LIDAR device may be configured to measure reflected portions of the emitted light pulse (using the detector) during a detection period that begins after emission of the light pulse. The detection period may be selected as a predetermined amount of time in which a reflected light pulse (reflected by a typical reflective surface that is within a threshold distance to the LIDAR device) is expected to have a sufficient amount of energy for reliable detection by the detector. For instance, the threshold distance (associated with the detection period) may correspond to a scanning range of the LIDAR device from which a reflected portion of the emitted light pulse is expected to have a sufficient amount of energy (e.g., after diverging away from a reflective surface) to distinguish the detected signal from background noise, etc.

However, some types of reflective surfaces, such as retroreflectors (e.g., traffic signs, etc.) and/or other types of highly reflective surfaces present in an environment of the LIDAR device for instance, may reflect a relatively higher amount of energy from the emitted light pulse back to the LIDAR device as compared to an expected amount of energy reflected from a typical reflective surface. For example, a retroreflector may reflect a greater fraction of incident energy than a typical reflective surface, and transmit the reflected energy back in a relatively narrower cone than the typical reflective surface.

Further, in some scenarios, reflections from a retroreflector (or other highly reflective material) may cause various errors in the collection and/or interpretation of LIDAR data. For instance, consider a scenario where the LIDAR device is configured to perform a sequence of scans of the scene. During a first scan, the LIDAR device may emit a first light pulse and then listen for reflections of the first light pulse during a first detection period. After the first detection period ends, the LIDAR device may then emit a second light pulse followed by a second detection period. In this scenario, an example error (e.g., retroreflector aliasing, etc.) may occur if the first light pulse of the first scan reflects off a distant retroreflector (e.g., located out of the expected scanning range of the LIDAR device), and then arrives back at the LIDAR device (as a reflected light pulse having sufficient energy to be detected by the LIDAR device) during the second detection period of the second scan (instead of during the first detection period of the first scan). For instance, the reflected light pulse (i.e., reflection of the first light pulse) may be incorrectly identified as a reflection of the second light pulse.

Other types of LIDAR scanning errors (e.g., channel cross-talk, saturation, blooming, etc.) associated with retroreflectors are possible as well. For example, the LIDAR device may include multiple transmit/receive channels that scan adjacent portions of a field-of-view (FOV) by emitting multiple spatially adjacent light pulses toward the FOV. In this example, a retroreflector in a first portion of the FOV scanned by a first channel may reflect a sufficiently strong signal that could be spuriously detected in one or more other channels (e.g., cross-talk between adjacent channels). For instance, in a representation of the scene (e.g., LIDAR data point cloud, etc.), these spurious detections may correspond to an apparent increase of the size of the retroreflector (e.g., blooming).

Accordingly, some example implementations herein may relate to detection of retroreflectors and/or management of LIDAR scanning errors associated with retroreflectors.

In a first example, a LIDAR device includes a primary emitter that emits a primary light pulse to illuminate a target region in a scene. The LIDAR device also includes a secondary emitter (e.g., external emitter, auxiliary emitter, etc.) that emits a relatively weaker secondary light pulse (as compared to the primary light pulse) toward the scene. Thus, the secondary light pulse (or a portion thereof) may illuminate the target region according to a secondary light intensity that is less than a primary light intensity of the primary light pulse. For instance, the secondary emitter can be configured as a wide field illuminator that emits a wide light beam to illuminate a larger portion of the scene (e.g., according to the lower secondary light intensity) than the portion illuminated by the primary light pulse (e.g., narrower light beam). The LIDAR device may also include a detector arranged to detect light (focused by the LIDAR device) from the target region illuminated by the primary light pulse.

In this example, the LIDAR device may be configured to emit the secondary (weaker) light pulse prior to emitting the primary (stronger) light pulse. For instance, after emitting the secondary light pulse, the LIDAR device may then monitor the focused light intercepted by the detector from the target region (e.g., during a secondary detection period) to determine if the detector has intercepted any reflections of the secondary light pulse. If the detector detects a reflection of the secondary light pulse (during the secondary detection period), then the LIDAR may be configured to detect that a retroreflector is present in the target region. For instance, the secondary light pulse may have a sufficiently low intensity such that a reflection of the secondary light pulse would not have sufficient energy to be detected (at the detector), unless the reflection was from a retroreflector or other highly reflective surface.

In alternative examples, the LIDAR device may be configured to emit the primary light pulse prior to the secondary light pulse.

In response to detection of a retroreflector, the LIDAR device may avoid or delay emitting the primary light pulse toward the retroreflector in the target region. In this way, the secondary light pulse can be used as an exploratory signal to avoid illuminating retroreflectors using the (stronger) primary light pulse. With this arrangement, errors associated with reflections from a retroreflector can be pre-empted by avoiding or delaying emission of the (high intensity) light pulse toward the retroreflector.

Alternatively, in a second example, the LIDAR device may be configured to allow the primary emitter to emit the primary light pulse, and then flag a returning reflection of the primary light pulse as a potential retroreflector error (e.g., for later filtering out of the LIDAR data, etc.).

In a third example, as a variation of the first example, the LIDAR device can be configured to emit a coded sequence of light pulses (i.e., without monitoring for reflections of the secondary light pulse). The coded sequence (e.g., secondary-secondary-primary, etc.), for instance, may include a combination of one or more primary light pulses and one or more secondary light pulses in a predetermined relative order. The LIDAR device may then compare the coded sequence of the emitted light pulses (e.g., emission times, order, etc.) to one or more light pulses detected (via the detector) in the focused light the target region (during a detection period that begins after the sequence of light pulses was emitted). Based on the comparison, the LIDAR device may then determine whether a detected light pulse is associated with: a retroreflector out of the scanning range of the LIDAR, a retroreflector within the scanning range of the LIDAR, and/or an object within the scanning range of the LIDAR device that is not a reflector, among other possibilities.

In a fourth example, as a variation of the first example, the LIDAR device may use a single emitter to emit both the primary light pulse and the secondary light pulse toward the target region. For instance, light emitted by the single emitter can be modulated to have a high intensity during emission of a primary light pulse and a low intensity during emission of a secondary light pulse.

II. EXAMPLE SENSOR SYSTEMS AND DEVICES

A non-exhaustive list of example sensors that can be employed herein includes LIDAR sensors, active IR cameras, and microwave cameras, among others. To that end, some example sensors herein may include active sensors that emit a signal (e.g., visible light signal, invisible light signal, radio-frequency signal, microwave signal, sound signal, etc.), and then detect reflections of the emitted signal from the surrounding environment. FIG. 1 is a simplified block diagram of a system 100, according to example embodiments. As shown, system 100 includes a power supply arrangement 102, a controller 104, a rotating platform 110, a stationary platform 112, one or more actuators 114, a rotary link 116, a transmitter 120, a receiver 130, one or more optical elements 140, and a housing 150. In some embodiments, system 100 may include more, fewer, or different components. Additionally, the components shown may be combined or divided in any number of ways. Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of the system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 116.

In some examples, controller 104 may include or otherwise be coupled to wiring used for transfer of control signals to various components of system 100 and/or for transfer of data from various components of system 100 to controller 104. For example, the data that controller 104 receives may include sensor data indicating detections of signals by receiver 130, among other possibilities. Moreover, the control signals sent by controller 104 may operate various components of system 100, such as by controlling emission of signals by transmitter 120, controlling detection of signals by the receiver 130, and/or controlling actuator(s) 114 to rotate rotating platform 110, among other possibilities.

As shown, controller 104 may include one or more processors 106 and data storage 108. In some examples, data storage 108 may store program instructions executable by processor(s) 106 to cause system 100 to perform the various operations described herein. To that end, processor(s) 106 may comprise one or more general-purpose processors and/or one or more special-purpose processors. To the extent that controller 104 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 104 may communicate with an external controller or the like (e.g., a computing system arranged in a vehicle to which system 100 is mounted) so as to help facilitate transfer of control signals and/or data between the external controller and the various components of system 100. Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 120. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 114 to cause the rotating platform to rotate at a particular frequency or phase. Other examples are possible as well.

Rotating platform 110 may be configured to rotate about an axis. To that end, rotating platform 110 can be formed from any solid material suitable for supporting one or more components mounted thereon. For example, transmitter 120 and receiver 130 may be arranged on rotating platform 110 such that each of these components moves relative to the environment based on rotation of rotating platform 110. In particular, these components could be rotated about an axis so that system 100 may obtain information from various directions. For instance, where the axis of rotation is a vertical axis, a pointing direction of system 100 can be adjusted horizontally by actuating the rotating platform 110 about the vertical axis.

Stationary platform 112 may take on any shape or form and may be configured for coupling to various structures, such as to a top of a vehicle, a robotic platform, assembly line machine, or any other system that employs system 100 to scan its surrounding environment, for example. Also, the coupling of the stationary platform may be carried out via any feasible connector arrangement (e.g., bolts, screws, etc.).

Actuator(s) 114 may include motors, pneumatic actuators, hydraulic pistons, and/or piezoelectric actuators, and/or any other types of actuators. In one example, actuator(s) 114 may include a first actuator configured to actuate the rotating platform 110 about the axis of rotation of rotating platform 110. In another example, actuator(s) 114 may include a second actuator configured to rotate one or more components of system 100 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 114 may include a third actuator configured to tilt (or otherwise move) one or more components of system 100. For instance, the third actuator can be used to move or replace a filter or other type of optical element 140 along an optical path of an emitted light pulse, or can be used to tilt rotating platform (e.g., to adjust the extents of a field-of-view (FOV) scanned by system 100, etc.), among other possibilities.

Rotary link 116 directly or indirectly couples stationary platform 112 to rotating platform 110. To that end, rotary link 116 may take on any shape, form and material that provides for rotation of rotating platform 110 about an axis relative to the stationary platform 112. For instance, rotary link 116 may take the form of a shaft or the like that rotates based on actuation from actuator(s) 114, thereby transferring mechanical forces from actuator(s) 114 to rotating platform 110. In one implementation, rotary link 116 may have a central cavity in which one or more components of system 100 may be disposed. In some examples, rotary link 116 may also provide a communication link for transferring data and/or instructions between stationary platform 112 and rotating platform 110 (and/or components thereon such as transmitter 120 and receiver 130).

Transmitter 120 may be configured to transmit signals toward an environment of system 100. As shown, transmitter 120 may include one or more emitters 122. Emitters 122 may include various types of emitters depending on a configuration of system 100.

In a first example, where system 100 is configured as a LIDAR device, transmitter 120 may include one or more light emitters 122 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 122 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where system 100 is configured as an active infrared (IR) camera, transmitter 120 may include one or more emitters 122 configured to emit IR radiation to illuminate a scene. To that end, transmitter 120 may include any type of emitter (e.g., light source, etc.) configured to provide the IR radiation.

In some implementations, system 100 (and/or transmitter 120) can be configured to emit a plurality of signals (e.g., light beams, IR signals, etc.) in a relative spatial arrangement that defines a FOV of system 100. For example, each beam (or signal) may be configured to propagate toward a portion of the FOV. In this example, multiple adjacent (and/or partially overlapping) beams may be directed to scan multiple respective portions of the FOV during a scan operation performed by system 100. Other examples are possible as well.

Receiver 130 may include one or more detectors 132 configured to detect reflections of the signals emitted by transmitter 120.

In a first example, where system 100 is configured as an active IR camera, receiver 130 may include one or more light detectors 132 (e.g., charge-coupled devices (CCDs), etc.) that are configured to detect a source wavelength of IR light transmitted by transmitter 120 and reflected off a scene toward receiver 130.

In a second example, where system 100 is configured as a LIDAR device, receiver 130 may include one or more light detectors 132 arranged to intercept and detect reflections of the light pulses or beams emitted by transmitter 120 that return to system 100 from the environment. Example light detectors 132 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light. In some instances, receiver 130 may be configured to detect light having wavelengths in the same wavelength range as the light emitted by transmitter 120. In this way, for instance, system 100 may distinguish received light originated by system 100 from other light originated by external sources in the environment.

In some implementations, receiver 130 may include a detector comprising an array of sensing elements connected to one another. For instance, where system 100 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety ways. For instance, the individual detectors of the array can be disposed on one or more substrates (e.g., printed circuit boards (PCBs), flexible PCBs, etc.) and arranged to detect incoming light that is traveling along an optical path of an optical lens of system 100 (e.g., optical element(s) 140). Also, such a photodetector array could include any feasible number of detectors arranged in any feasible manner.

In some examples, system 100 can select or adjust a horizontal scanning resolution by changing a rate of rotation of system 100 (and/or transmitter 120 and receiver 130). Additionally or alternatively, the horizontal scanning resolution can be modified by adjusting a pulse rate of signals emitted by transmitter 120. In a first example, transmitter 120 may be configured to emit pulses at a pulse rate of 15,650 pulses per second, and to rotate at 10 Hz (i.e., ten complete 360° rotations per second) while emitting the pulses. In this example, receiver 130 may have a 0.23° horizontal angular resolution (e.g., horizontal angular separation between consecutive pulses). In a second example, if system 100 is instead rotated at 20 Hz while maintaining the pulse rate of 15,650 pulses per second, then the horizontal angular resolution may become 0.46°. In a third example, if transmitter 120 emits the pulses at a rate of 31,300 pulses per second while maintaining the rate of rotation of 10 Hz, then the horizontal angular resolution may become 0.115°. In some examples, system 100 can be alternatively configured to scan a particular range of views within less than a complete 360° rotation of system 100. Other implementations are possible as well.

It is noted that the pulse rates, angular resolutions, rates of rotation, and viewing ranges described above are only for the sake of example, and thus each of these scanning characteristics could vary according to various applications of system 100.

Optical element(s) 140 can be optionally included in or otherwise coupled to transmitter 120 and/or receiver 130. In one example, optical element(s) 140 can be arranged to direct light emitted by emitter(s) 122 toward a scene (or a region therein). In another example, optical element(s) 140 can be arranged to focus light from the scene (or a region therein) toward detector(s) 132. As such, optical element(s) 140 may include any feasible combination of optical elements, such as filters, apertures, mirror(s), waveguide(s), lens(es), or other types optical components, that are arranged to guide propagation of light through physical space and/or to adjust a characteristic of the light.

In some examples, controller 104 could operate actuator 114 to rotate rotating platform 110 in various ways so as to obtain information about the environment. In one example, rotating platform 110 could be rotated in either direction. In another example, rotating platform 110 may carry out complete revolutions such that system 100 scans a 360° view of the environment. Moreover, rotating platform 110 could rotate at various frequencies so as to cause system 100 to scan the environment at various refresh rates. In one embodiment, system 100 may be configured to have a refresh rate of 10 Hz (e.g., ten complete rotations of system 100 per second). Other refresh rates are possible.

Alternatively or additionally, system 100 may be configured to adjust the pointing direction of an emitted signal (emitted by transmitter 120) in various ways. In one implementation, signal emitters (e.g., light sources, antennas, acoustic transducers, etc.) of transmitter 120 can be operated according to a phased array configuration, or other type of beam steering configuration (e.g., a specific location within a beam pattern could be nulled, etc.).

In one example, where system 100 is configured as a LIDAR device, light sources or emitters in transmitter 120 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

Housing 150 may take on any shape, form, and material and may be configured to house one or more components of system 100. In one example, housing 150 can be a dome-shaped housing. Further, in some examples, housing 150 may be composed of or may include a material that is at least partially non-transparent, which may allow for blocking of at least some signals from entering the interior space of the housing 150 and thus help mitigate thermal and noise effects of ambient signals on one or more components of system 100. Other configurations of housing 150 are possible as well.

In some examples, housing 150 may be coupled to rotating platform 110 such that housing 150 is configured to rotate based on rotation of rotating platform 110. In these examples, transmitter 120, receiver 130, and possibly other components of system 100 may each be disposed within housing 150. In this manner, transmitter 120 and receiver 130 may rotate along with housing 150 while being disposed within housing 150. In other examples, housing 150 may be coupled to stationary platform 112 or other structure such that housing 150 does not rotate with the other components rotated by rotating platform 110.

It is noted that this arrangement of system 100 is described for exemplary purposes only and is not meant to be limiting. As noted above, in some examples, system 100 can be alternatively implemented with fewer components than those shown. In one example, system 100 can be implemented without rotating platform 100. For instance, transmitter 120 can be configured to transmit a plurality of signals spatially arranged to define a particular FOV of system 100 (e.g., horizontally and vertically) without necessarily rotating transmitter 120 and receiver 130. Other examples are possible as well.

Figure 2A:
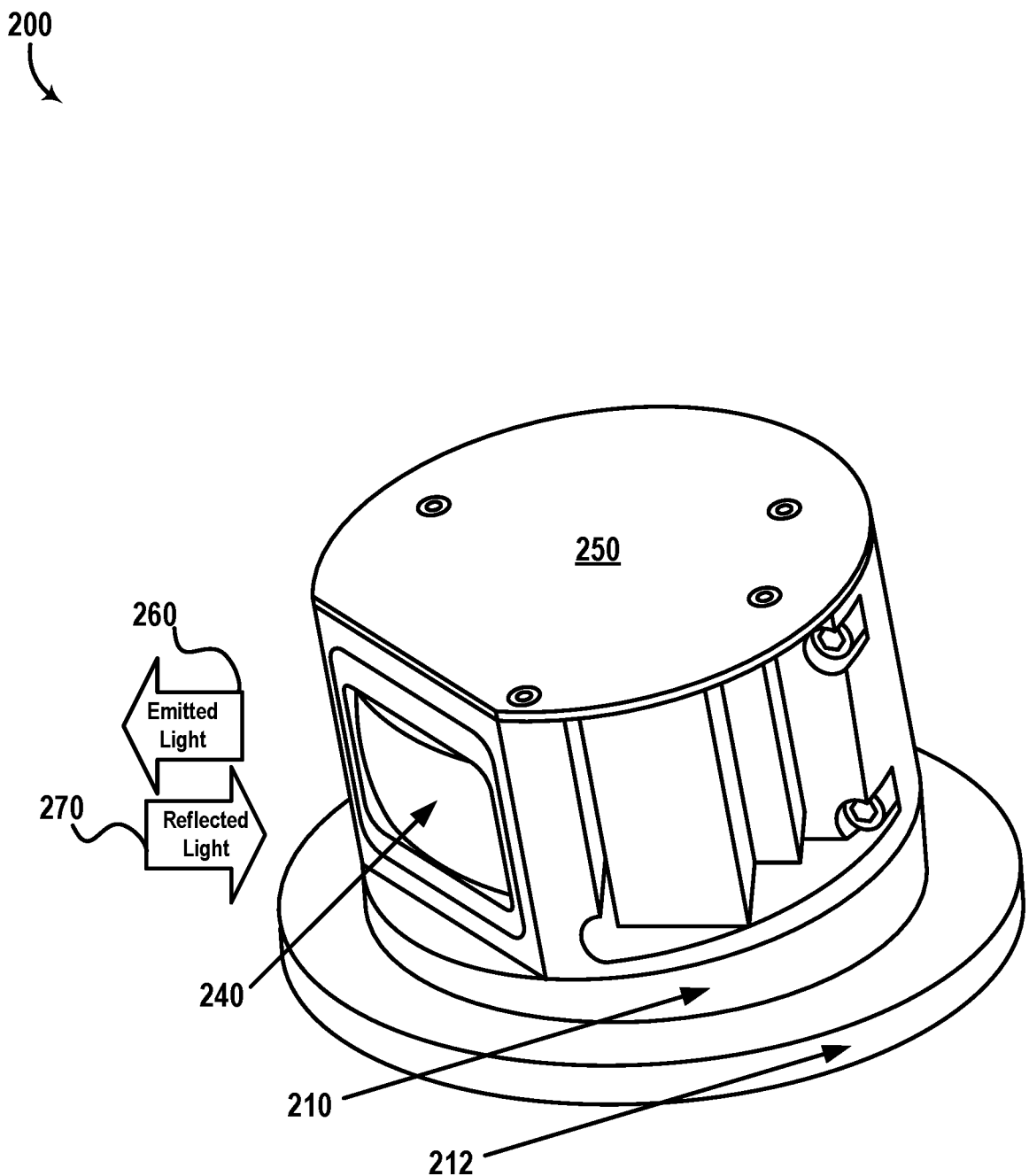
FIG. 2A illustrates a first LIDAR device, according to example embodiments.

FIG. 2A illustrates a first LIDAR device 200, according to example embodiments. In some examples, LIDAR 200 may be similar to system 100. For example, as shown, LIDAR device 200 includes a rotating platform 210, a stationary platform 212, a lens 240, and a housing 250 which may be similar, respectively, to rotating platform 110, stationary platform 112, optical element 140, and housing 150. In the scenario shown, light beams 260 emitted by LIDAR device 200 may propagate from lens 240 along a viewing (or pointing) direction of LIDAR 200 toward a FOV of LIDAR 200 (e.g., toward a scene, etc.), and may then reflect off one or more objects in the scene as reflected light 270.

In some examples, housing 250 can be configured to have a substantially cylindrical shape and to rotate about an axis of LIDAR device 200. In one example, housing 250 can have a diameter of approximately 10 centimeters. Other examples are possible. In some examples, the axis of rotation of LIDAR device 200 is substantially vertical. For instance, LIDAR 200 can be configured to scan a 360-degree view of the environment by rotating housing 250 about a vertical axis. Additionally or alternatively, in some examples, LIDAR device 200 can be configured to tilt the axis of rotation of housing 250 to control a field of view of LIDAR device 200. Thus, in some examples, rotating platform 210 may comprise a movable platform that may tilt in one or more directions to change the axis of rotation of LIDAR device 200.

In some examples, lens 240 can have an optical power to both collimate (and/or direct) emitted light beams 260 toward the environment of device 200, and to focus reflected light 270 from one or more objects in the environment of LIDAR device 200 onto detectors in LIDAR device 200. In one example, lens 240 has a focal length of approximately 120 mm. Other examples are possible. By using the same lens 240 to perform both of these functions, instead of a transmit lens for collimating and a receive lens for focusing, advantages with respect to size, cost, and/or complexity can be provided.

In other examples, instead of the single lens 240 configuration as shown in FIG. 2A, LIDAR 200 could be alternatively implemented to include a transmit lens (for manipulating emitted light 260) and a separate receive lens (for focusing reflected light 270).

Figure 2B:
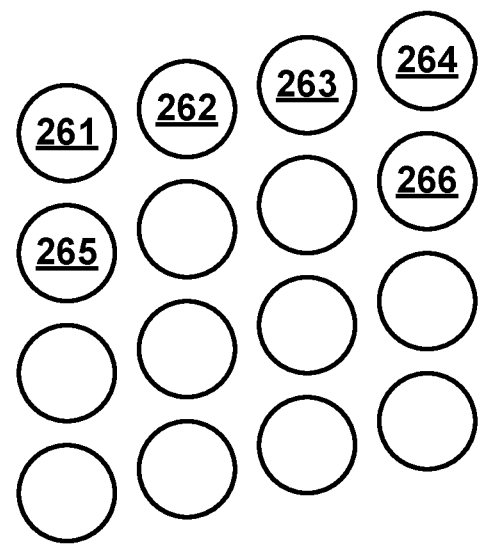
FIG. 2B illustrates a cross-section view of the light emitted by the first LIDAR device.

FIG. 2B illustrates a cross-section view of emitted light 260 of FIG. 2A. As shown, emitted light 260 may include a plurality of light beams, exemplified by beams 261-266, which are spatially arranged to cover respective portions of a FOV scanned by LIDAR 200. For example, in the scenario shown in FIG. 2B, the beams (e.g., 261-266) transmitted by LIDAR 200 may be propagating through the page.

In some examples, LIDAR 200 may transmit the plurality of beams 261-266, etc., in a relative spatial arrangement such as the arrangement shown in FIG. 2B. For instance, beam 261 may illuminate a first target region in the scene, beam 262 may illuminate a second (adjacent) target region in the scene, and so on. To that end, beam 261 may have a first (elevational and azimuthal) angular position in the spatial arrangement, beam 262 may have a second angular position in the spatial arrangement, and so on. The angular positions of the respective beams may be defined by one or more optical elements (e.g., optical elements 108), such as any combination of lenses, mirrors, waveguides, etc.

Although not shown, in some examples, LIDAR 200 may include a plurality of detectors (not shown) configured to detect reflected signals (e.g., light) from respective target regions of the scene illuminated by beams 261-266, etc. Referring back to FIG. 2A for example, lens 240 may be configured to focus received light 270 for receipt by a plurality of detectors (e.g., detectors 132 of system 100) inside housing 250. Moreover, a first detector can be arranged to receive a first portion of the focused light that includes a reflection of beam 261, a second detector can be arranged to receive a second portion of the focused light that includes a reflection of beam 262, and so on. Thus, for instance, LIDAR 200 may scan each target region illuminated by a respective beam by focusing returning light from the target region onto a respective detector.

Although not shown, LIDAR 200 may include one or more emitters (e.g., emitters 122) that emit the plurality of beams shown in FIG. 2B.

In a first implementation, LIDAR 200 may include a single emitter configured to emit the light included in all the transmitted beams 261-266, etc. For instance, LIDAR 200 may include one or more optical elements (e.g., optical elements 140), such as beam splitters, mirrors, waveguides, etc., arranged to split light emitted by the single emitter into multiple separate beams.

In a second implementation, LIDAR 200 may include a plurality of emitters. For instance, a first emitter may emit signals for illuminating a first portion of the FOV of LIDAR 200, and a second emitter may emit light for illuminating a second portion of the FOV. In one example, the first emitter may be coupled to optical elements (e.g., waveguide(s), aperture(s), lens(es), etc.) that direct its emitted light to the angular position of beam 261 in the spatial arrangement of the emitted beams. Similarly, in this example, signals emitted by the second emitter may be directed to the angular position of 262, and so on. Alternatively, in another example, light from each emitter could be split into multiple beams. For instance, light from the first emitter can be split into the row of beams including beams 261, 262, 263, 264. Similarly, for instance, signals from the second emitter may be split to provide a second row of beams (e.g., including beams 265 and 266), and so on.

Additionally, in some examples, LIDAR 200 may be configured to obtain a sequence of scans of the scene. For example, LIDAR 200 can obtain a first scan by transmitting a first plurality of light pulses in the spatial arrangement shown during a first emission period of the first scan, and then monitoring the illuminated scene for reflections of the first plurality of light pulses during a first detection period that begins after the first emission period. LIDAR 200 may then obtain a second scan by transmitting a second plurality of beams (in the same spatial arrangement) during a second emission period of the second scan, and so on. Thus, LIDAR 200 can be configured to repeatedly scan the scene while providing multiple transmit/receive channels of sensor data during each scan (e.g., by measuring multiple (adjacent) target regions in the scene separately during each scan).

It is noted that the arrangement, shapes, and/or number of the plurality of emitted beams shown in FIG. 2B may vary, and are only illustrated as shown for convenience in description. For example, emitted light 260 may include more or fewer beams than shown in FIG. 2B. As another example, the beams can be arranged in a different spatial arrangement (e.g., circular arrangement, linear arrangement, grid arrangement, etc.) than the spatial arrangement shown in FIG. 2B.

Figure 3A:
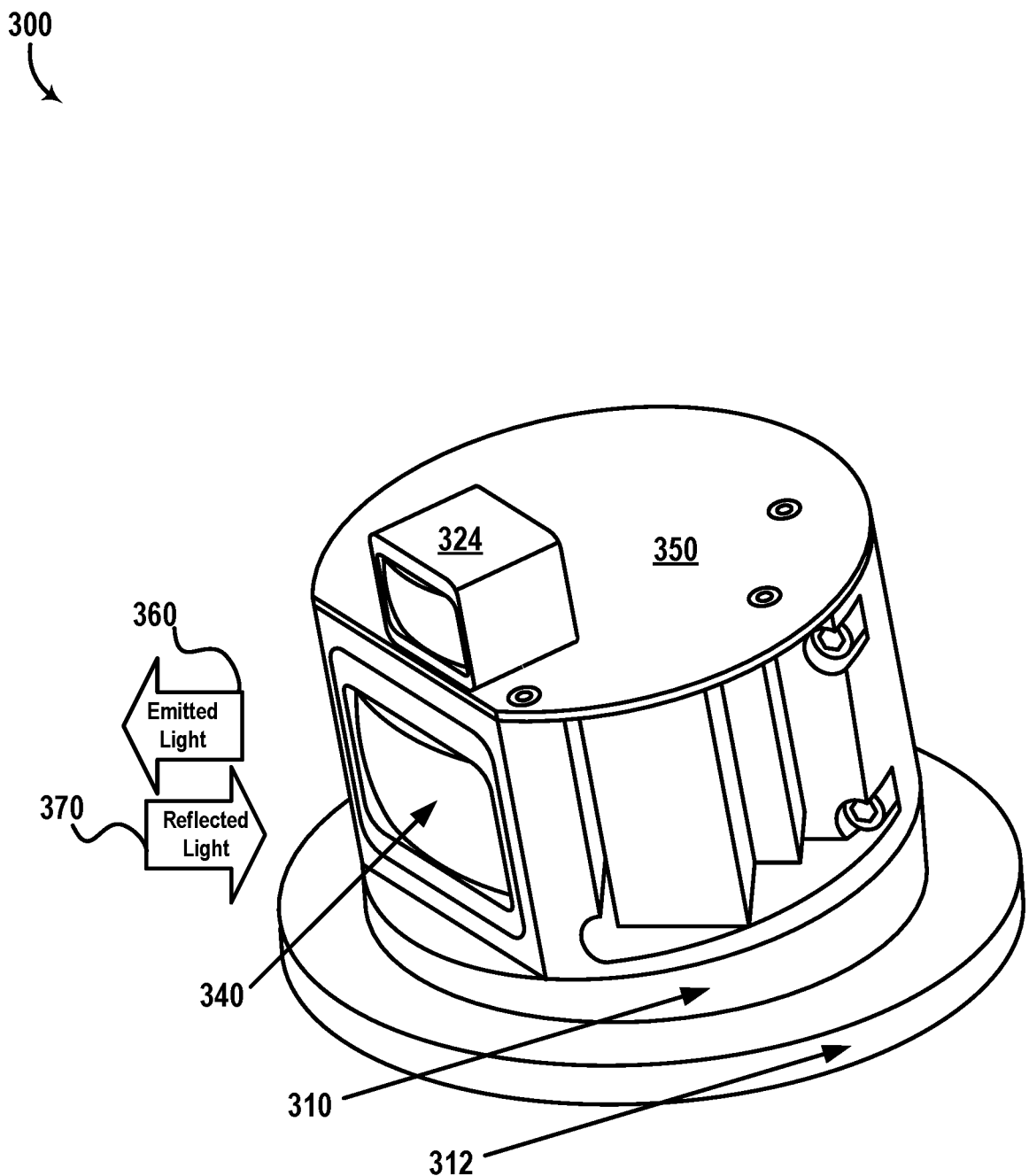
FIG. 3A illustrates a second LIDAR device, according to example embodiments.

FIG. 3A illustrates a second LIDAR device 300, according to example embodiments. LIDAR 300 may be similar to LIDAR 200. For example, LIDAR 300 may emit light 360 toward a scene and detect reflected portions (i.e., reflected light 370) of the emitted light returning to LIDAR 300 from the scene. As shown, LIDAR 300 includes a rotating platform 310, a stationary platform 312, a lens 340, and a housing 350 that are similar, respectively, to rotating platform 210, stationary platform 212, lens 240, and housing 250. As shown, LIDAR 300 also includes a secondary emitter 324 disposed outside housing 350. Emitter 324 may include a light source (e.g., LED, etc.) similar to any of the light sources described for emitter(s) 122 of system 100. Secondary emitter 324 may be configured to illuminate one or more target regions in the scene that are also illuminated by light from primary emitter(s) (not shown) inside housing 350. Thus, for example, emitted light 360 may include one or more primary light pulses transmitted along a first optical path (e.g., through lens 340) toward the scene, as well as one or more secondary light pulses transmitted along a second optical path (e.g., via emitter 324) toward the scene.

Figure 3B:
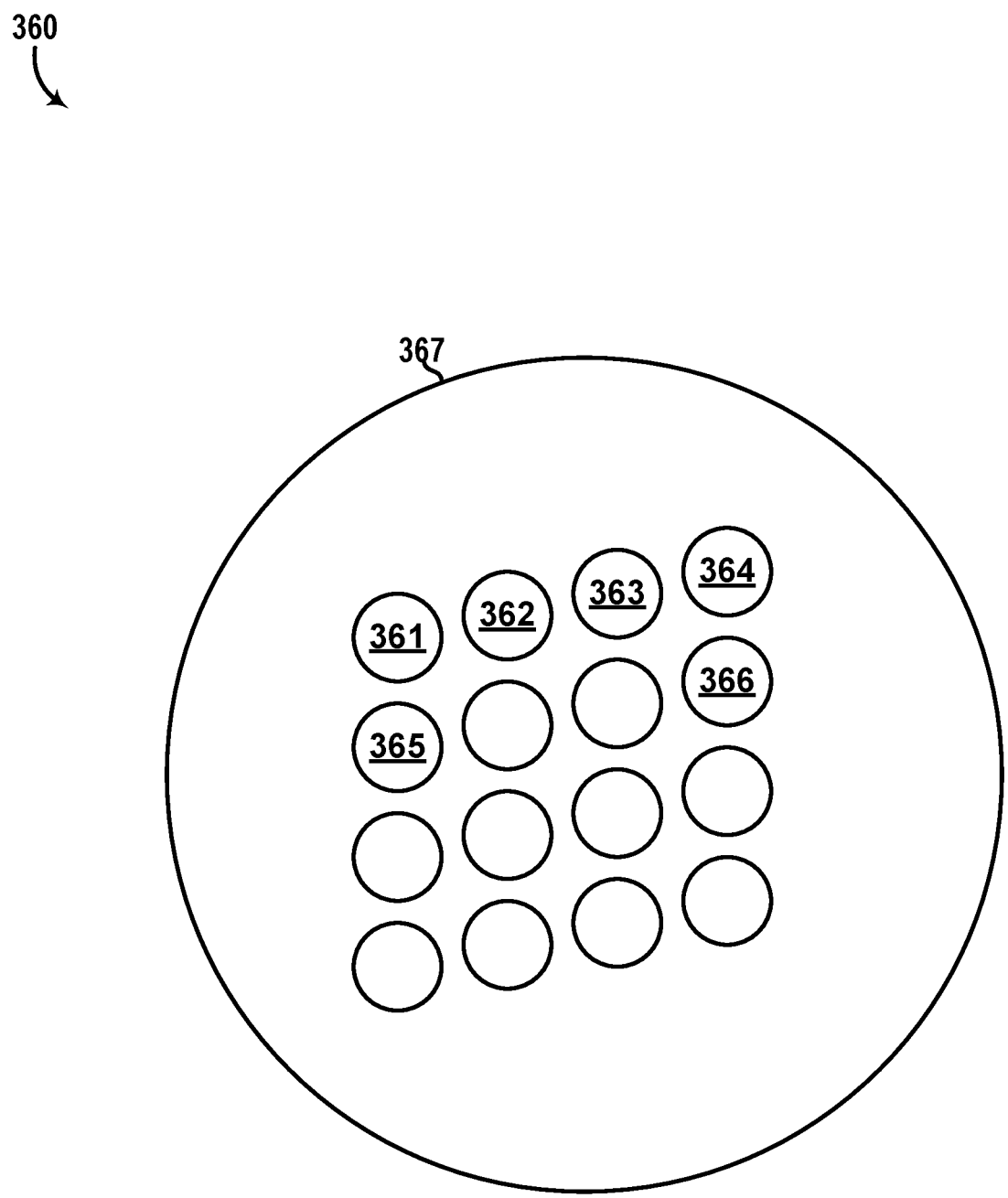
FIG. 3B illustrates a cross-section view of the light emitted by the second LIDAR device.

FIG. 3B illustrates a cross-section view of emitted light 360. The cross-section view of emitted light 360 shown in FIG. 3B may be similar to the cross-section view of emitted light 260 shown in FIG. 2B. For example, each of light beams 361, 362, 363, 364, 365, 366, 367 may propagate out of the page toward one or more objects in the scene.

The narrower light beams (e.g., smaller circles in the illustration of FIG. 3B), exemplified by beams 361-366, may be similar, respectively, to beams 261-266, etc., shown in FIG. 2B. For example, narrower light beams 361-366, etc., may correspond to a portion of light 360 that is emitted by primary emitter(s) (not shown) disposed inside housing 350, and that is transmitted through lens 340 to illuminate a plurality of target regions in the scene.

Additionally, the wider light beam 367 (e.g., larger circle in the illustration of FIG. 3B) may correspond to a secondary light beam emitted by external/secondary emitter 324 toward the same scene illuminated by narrower beams 261-266, etc. As such, for example, a first portion of secondary beam 367 may illuminate a first target region that is also illuminated by primary beam 361, a second portion of secondary beam 367 may illuminate a second target region that is also illuminated by primary beam 362, and so on.

Figure 4A:
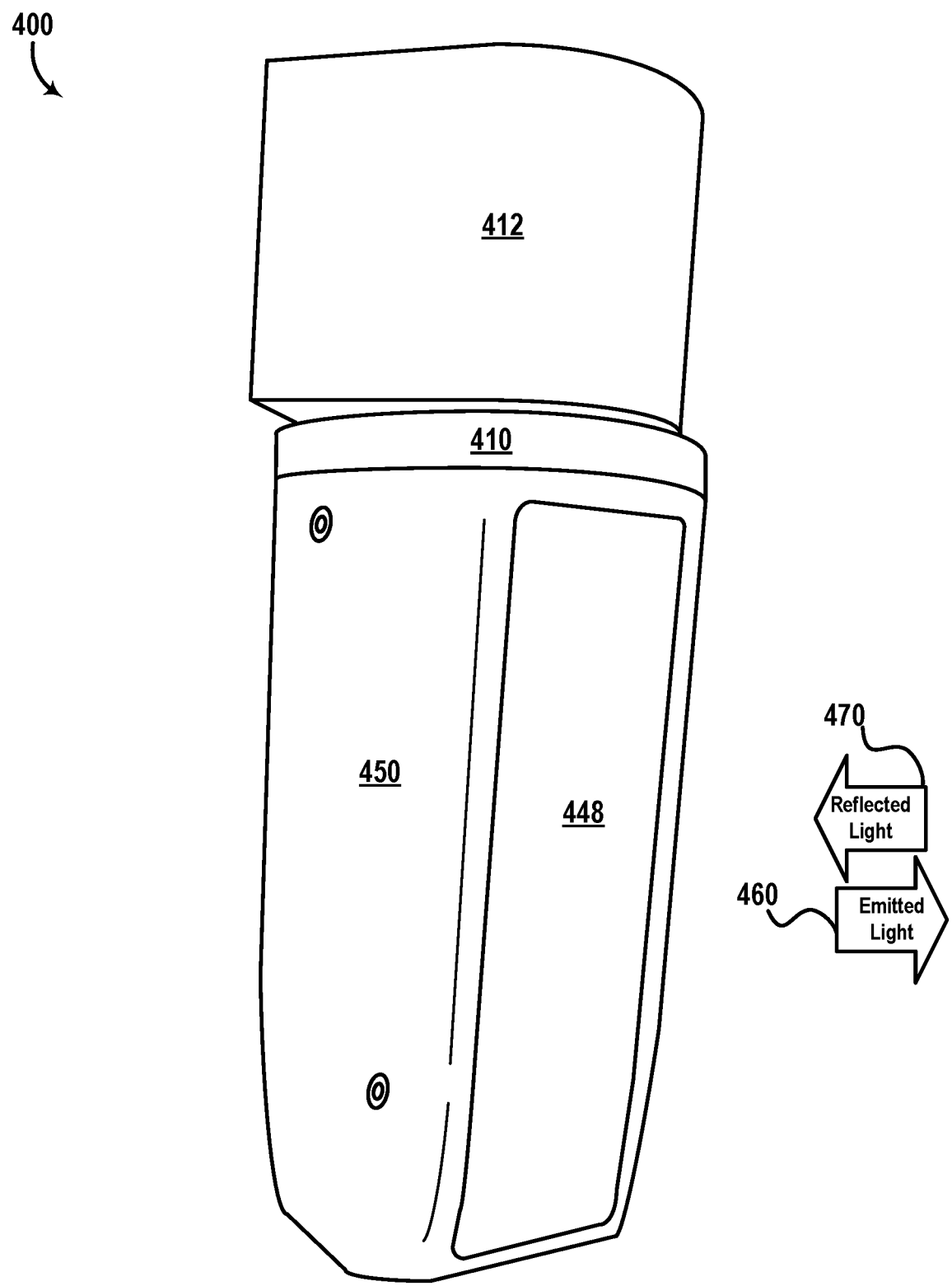
FIG. 4A illustrates a third LIDAR device, according to example embodiments.

FIG. 4A illustrates a third LIDAR device 400, according to example embodiments. As shown, LIDAR 400 includes a rotating platform 410, a stationary platform 412, and a housing 450 that are similar, respectively, to rotating platform 110, stationary platform 112, and housing 350 of system 100.

Similarly to LIDARs 200 and 300, LIDAR 400 may be configured to scan an environment by emitting light 460 toward the environment, and detecting reflect portions (e.g., reflected light 470) of the emitted light returning to LIDAR 400 from the environment. Further, to adjust a FOV scanned by LIDAR 400 (i.e., the region illuminated by emitted light 460), rotating platform 410 may be configured to rotate housing 450 (and one or more components included therein) about an axis of rotation of rotating platform 410. For instance, where the axis of rotation of platform 410 is a vertical axis, rotating platform 410 may adjust the direction of emitted light 460 horizontally to define the horizontal extents of the FOV of LIDAR 400.

As shown, LIDAR 400 also includes an optical window 448 through which emitted light 460 is transmitted out of housing 450, and through which reflected light 470 enters into housing 450. Thus, housing 450 may define an optical cavity in which one or more components disposed inside the housing (e.g., transmitter, receiver, etc.) are optically isolated from external light in the environment, except for light that propagates through one or more optical windows (e.g., window 448) into the housing (e.g., light 360, light 370, etc.). With this arrangement for instance, LIDAR 400 may reduce interference from external light (e.g., noise, etc.) with the signals transmitted and/or received by LIDAR 400.

To that end, in some embodiments, optical window 448 may include a material that is transparent to the wavelengths of emitted light 470 and/or one or more other wavelengths. For example, optical window 448 may be formed from a glass substrate (e.g., optical glass, polymethyl methacrylate, etc.) or a plastic substrate (e.g., optical plastics or plastics formed via injection molding, etc.), among others. Additionally, in some examples, optical window 448 may include or may be coupled to a filter that selectively transmits wavelengths of emitted light 460, while reducing transmission of other wavelengths through the optical window 448. Optical window 448 may have various thicknesses. In one embodiment, optical window 448 may have a thickness between 1 millimeter and 2 millimeters. However, other thicknesses are possible as well.

Figure 4B:
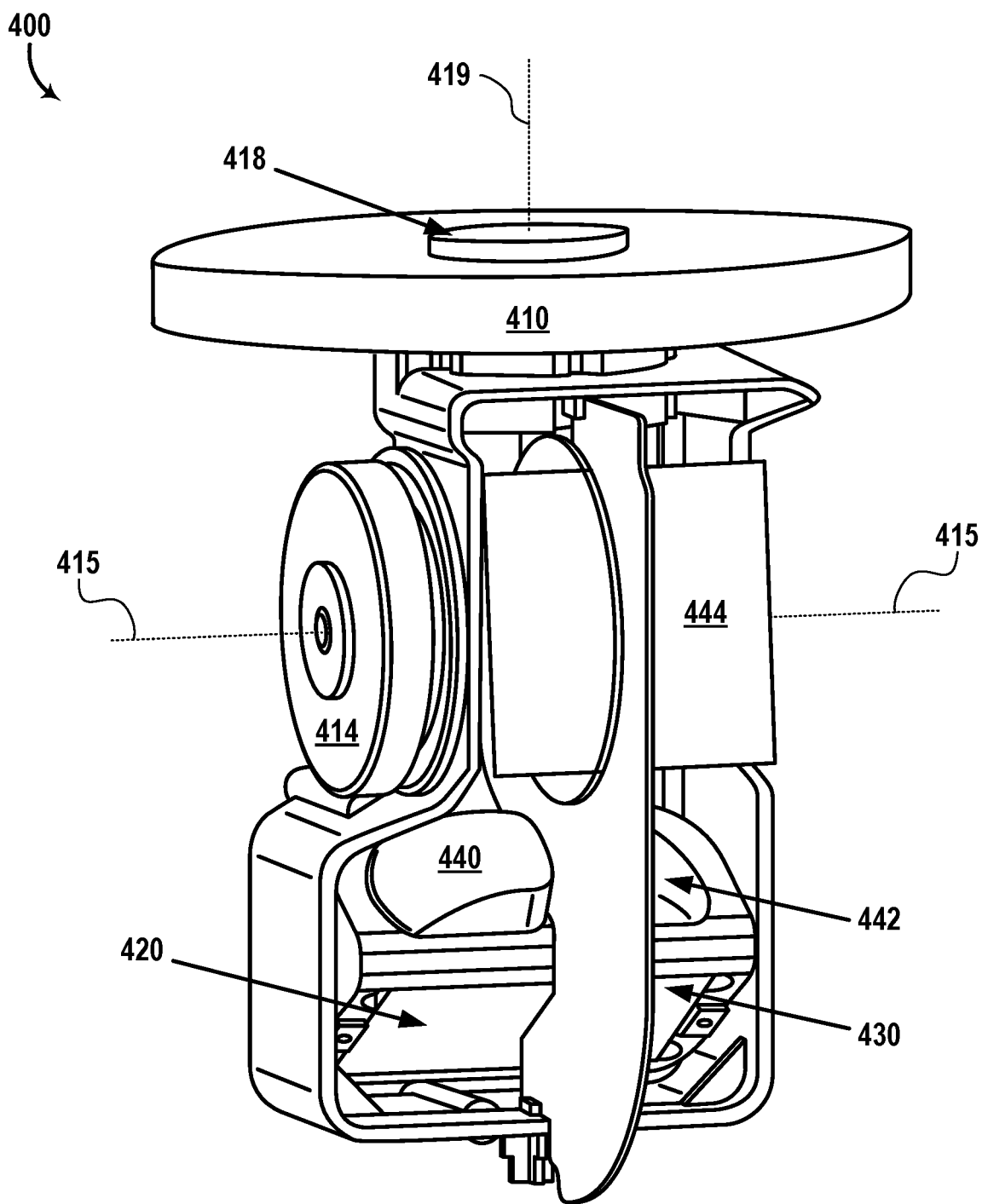
FIG. 4B illustrates a partial perspective view of the third LIDAR device.

FIG. 4B illustrates a partial cross-section view of LIDAR 400. It is noted that some of the components of LIDAR 400 (e.g., platform 412, housing 450, and optical window 448) are omitted from the illustration of FIG. 4B for convenience in description.

As shown in FIG. 4B, LIDAR device 400 also includes actuators 414 and 418, which may be similar to actuators 114 of system 100. Additionally, as shown, LIDAR 400 includes a transmitter 420 and a receiver 430, which may be similar, respectively, to transmitter 120 and receiver 130 of system 100. Additionally, as shown, LIDAR 400 includes one or more optical elements (i.e., a transmit lens 440, a receive lens 442, and a mirror 444), which may be similar to optical elements 140 of system 100.

Actuators 414 and 418 may include a stepper motor, an electric motor, a combustion motor, a pancake motor, a piezoelectric actuator, or any other type of actuator, such as those describe for actuators 114 of system 100.

As shown, actuator 414 may be configured to rotate the mirror 444 about a first axis 415, and actuator 418 may be configured to rotate rotating platform 410 about a second axis 419. In some embodiments, axis 415 may correspond to a horizontal axis of LIDAR 400 and axis 419 may correspond to a vertical axis of LIDAR 400 (e.g., axes 415 and 419 may be substantially perpendicular to one another).

In an example operation, LIDAR transmitter 420 may emit light (via transmit lens 440) that reflects off mirror 444 to propagate away from LIDAR 400 (e.g., as emitted light 460 shown in FIG. 4A). Further, received light from the environment of LIDAR 400 (including light 470 shown in FIG. 4A) may be reflected off mirror 444 toward LIDAR receiver 430 (via lens 442). Thus, for instance, a vertical scanning direction of LIDAR 400 can be controlled by rotating mirror 444 (e.g., about a horizontal axis 415), and a horizontal scanning direction of LIDAR 400 can be controlled by rotating LIDAR 400 about a vertical axis (e.g., axis 419) using rotating platform 410.

In this example, mirror 444 could be rotated while transmitter 420 is emitting a series of light pulses toward the mirror. Thus, depending on the rotational position of the mirror about axis 415, each light pulse could thus be steered (e.g., vertically). As such, LIDAR 400 may scan a vertical FOV defined by a range of (vertical) steering directions provided by mirror 444 (e.g., based on a range of angular positions of mirror 444 about axis 415). In some examples, LIDAR 400 may be configured to rotate mirror 444 one or more complete rotations to steer emitted light from transmitter 420 (vertically). In other examples, LIDAR device 400 may be configured to rotate mirror 444 within a given range of angles to steer the emitted light over a particular range of directions (vertically). Thus, LIDAR 400 may scan a variety of vertical FOVs by adjusting the rotation of mirror 444. In one embodiment, the vertical FOV of LIDAR 400 is 95° (e.g., yaw angle range of +21° to −74°). Other vertical FOVs are possible as well.

Continuing with this example, platform 410 may be configured to rotate the arrangement of components supported thereon (e.g., mirror 444, motor 414, lenses 430 and 432, transmitter 420, and receiver 430) about a vertical axis (e.g., axis 419). Thus, LIDAR 400 may rotate platform 410 to steer emitted light (from transmitter 420) horizontally (e.g., about the axis of rotation 419 of platform 410). Additionally, the range of the rotational positions of platform 410 (about axis 419) can be controlled to define a horizontal FOV of LIDAR 400. In one embodiment, platform 410 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 4C:
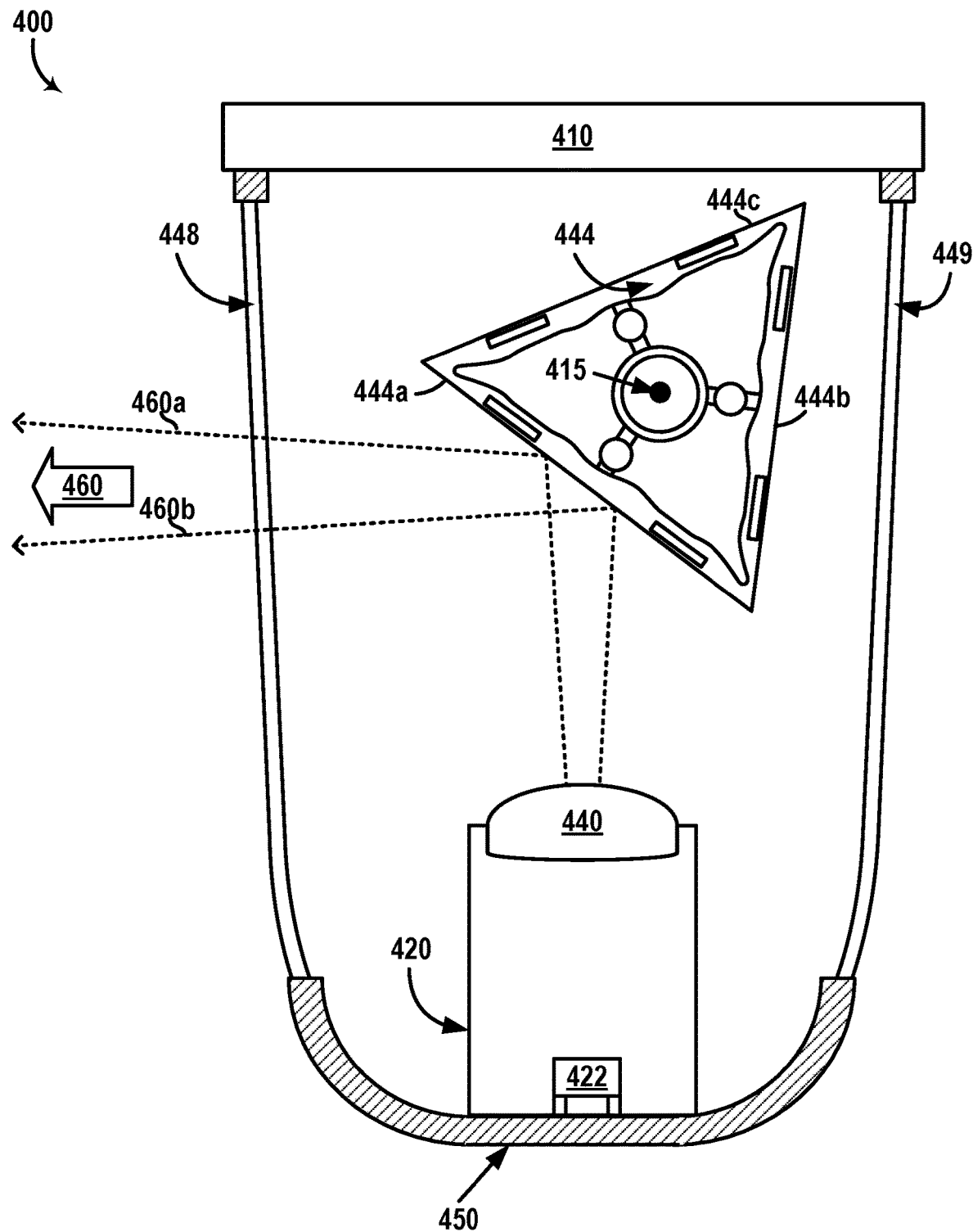
FIG. 4C illustrates a partial cross-section view of the third LIDAR device.

FIG. 4C illustrates a partial cross-section view of LIDAR device 400. It is noted that some of the components of LIDAR 400 are omitted from the illustration of FIG. 4C for convenience in description. In the cross-section view of FIG. 4C, axis 415 may be perpendicular to (and may extend through) the page.

As shown in FIG. 4C, LIDAR 400 also includes a second optical window 449 that is positioned opposite to optical window 448. Optical window 449 may be similar to optical window 448, and may be configured to (e.g., selectively) transmit light into and/or out of the optical cavity defined by housing 450 (and through the opposite side of housing 450), in line with the discussion above.

As shown in FIG. 4C, transmitter 420 includes an emitter 422, which may include any of the light sources described for emitter(s) 122, for instance. In alternative embodiments, transmitter 420 may include more than one light source. Emitter 422 may be configured to emit one or more light pulses 460 (e.g., laser beams, etc.). Transmit lens 440 may be configured to direct (and/or collimate) the emitted light from emitter 422 toward mirror 444. For example, transmit lens 440 may collimate the light from the emitter to define a beam width of the light beam 460 transmitted out of LIDAR 400 (e.g., the beam divergence angle between dotted lines 460a and 460b).

As shown in FIG. 4C, mirror 444 may include a triangular mirror that has three reflective surfaces 444a, 444b, 444c. However, in other examples, mirror 444 may alternatively include additional or fewer reflective surfaces. In the example shown, the emitted light transmitted through transmit lens 440 may then reflect off reflective surface 444a toward the environment of LIDAR 400 in the direction illustrated by arrow 460. Thus, in this example, as mirror 444 is rotated (e.g., about axis 415), emitted light 460 may be steered to have a different direction than that illustrated by arrow 460. For example, the direction 460 of the emitted light could be adjusted based on the rotational position of triangular mirror 444.

Additionally, in some examples, emitted light 460 may be steered out of housing 450 through optical window 448 or through optical window 449 depending on the rotational position of mirror 444 about axis 415. Thus, in some examples, LIDAR 400 may be configured to steer emitted light beam 460 within a wide range of directions (e.g., vertically), and/or out of either side of housing 450 (e.g., the sides where optical windows 448 and 448 are located).

Figure 4D:
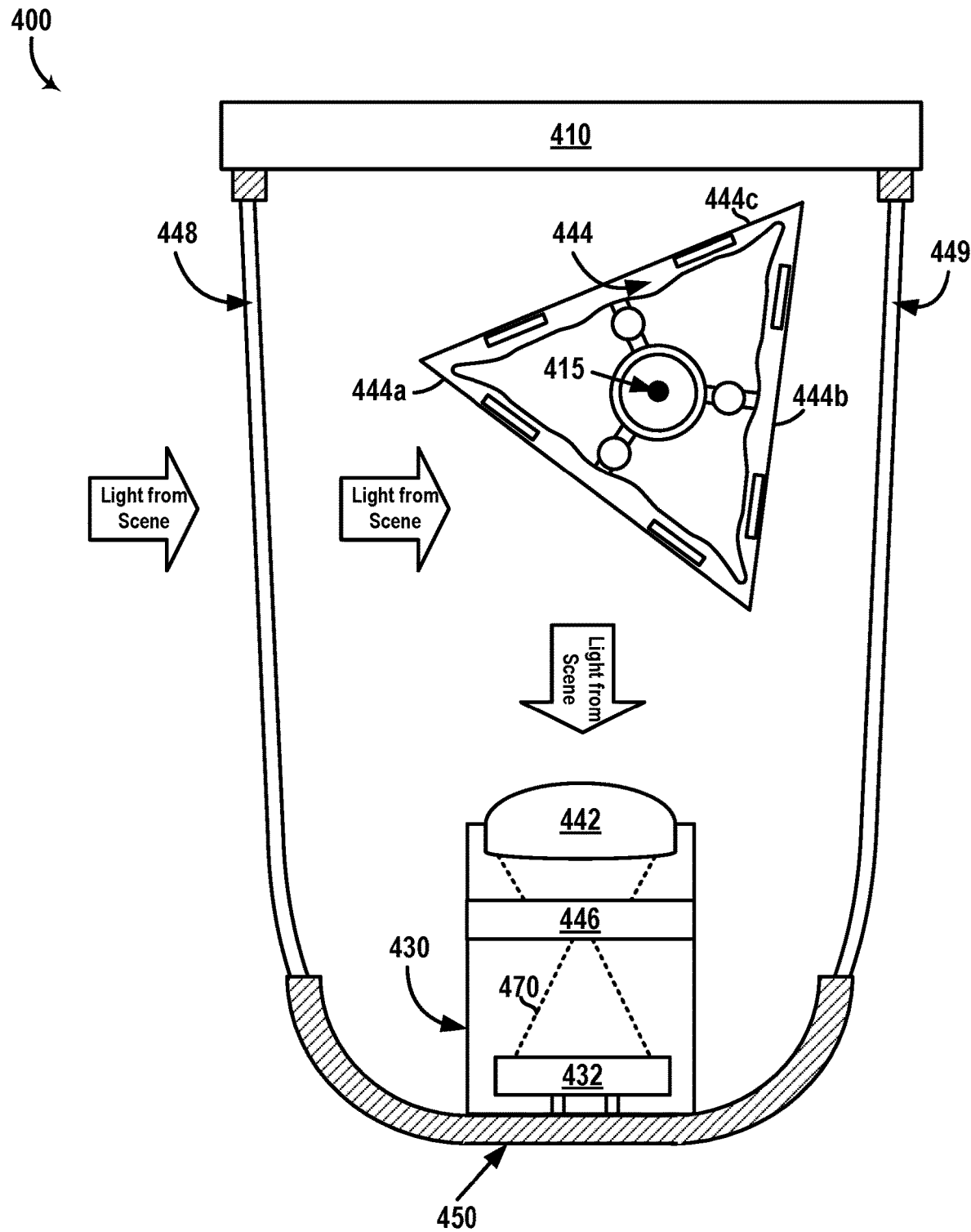
FIG. 4D illustrates another partial cross-section view of the third LIDAR device.

FIG. 4D illustrates another partial cross-section view of LIDAR device 400. It is noted that some of the components of LIDAR 400 are omitted from the illustration of FIG. 4D for convenience in description. As shown, receiver 430 includes one or more light detectors 432, which may be similar to detector(s) 112 of system 100. Further, as shown, receiver 430 includes a diaphragm 446 between receive lens 442 and detector(s) 432.

Diaphragm 446 may include one or more optical elements (e.g., aperture stop, filter, etc.) configured to select a portion the light focused by receive lens 442 for transmission toward detector(s) 432.

For example, receive lens 442 may be configured to focus light received from the scene scanned by LIDAR 400 (e.g., light from the scene that enters window 448 or window 449 and is reflected by mirror 444) toward diaphragm 446. In line with the discussion above, detector(s) 432 may be arranged (or aligned) to intercept a portion of the focused light that includes light from the target region illuminated by transmitter 420. To facilitate this, for example, diaphragm 446 may include an aperture positioned and/or sized to transmit the portion of the focused light associated with the target region through the aperture as diverging light (e.g., including reflected light 470) for detection by detector(s) 432.

It is noted that the various positions, shapes, and sizes of the various components of LIDAR 400 as well the light beams emitted (or received) by LIDAR 400 may vary and are not necessarily to scale, but are illustrated as shown in FIGS. 4A-4D for convenience in description.

Figure 5:
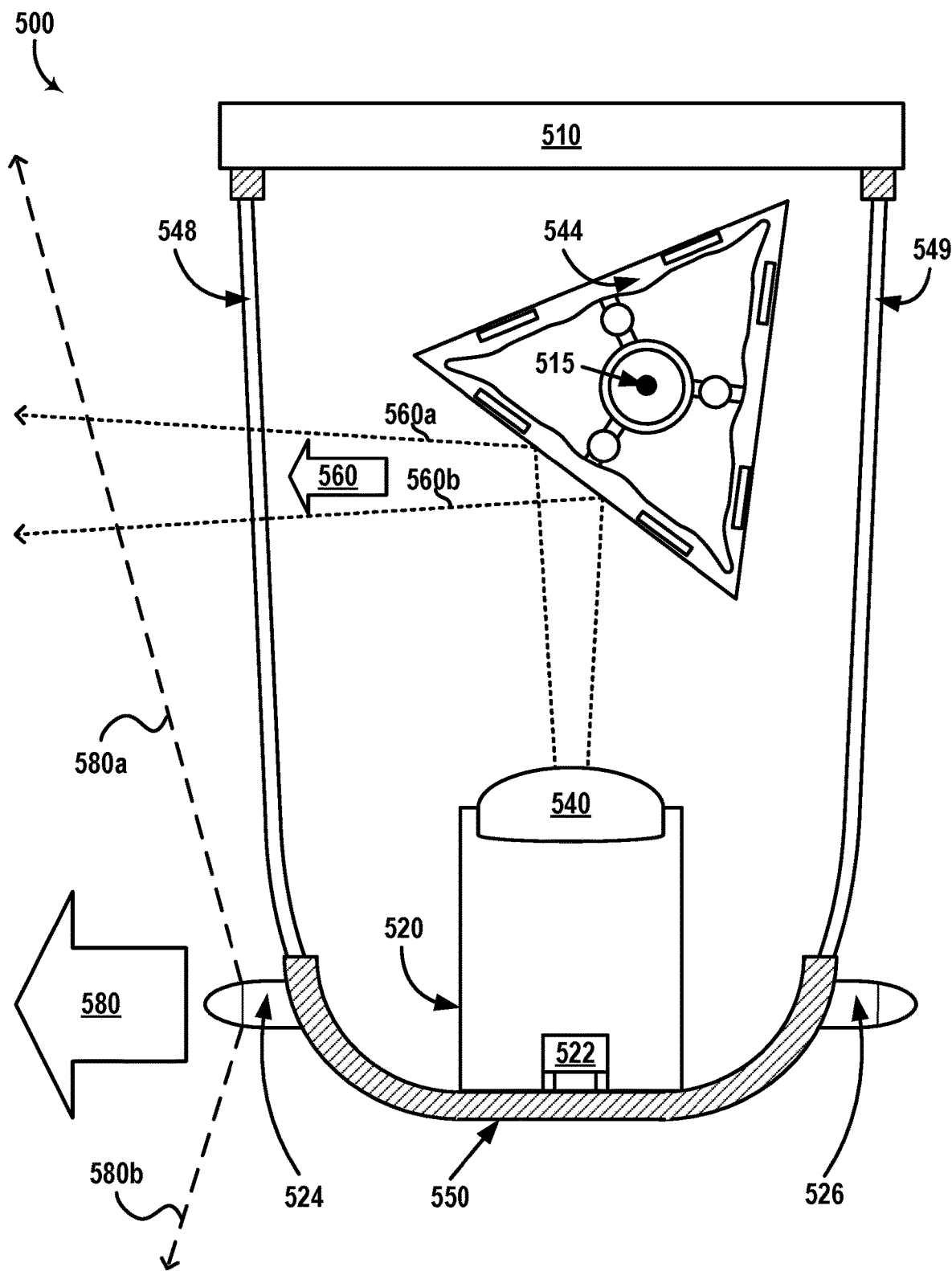
FIG. 5 illustrates a partial cross-section view of a fourth LIDAR device, according to example embodiments.

FIG. 5 illustrates a partial cross-section view of a fourth LIDAR device 500, according to example embodiments. LIDAR 500 may be similar to LIDAR 400, and the cross-section view of LIDAR 500 shown in FIG. 5 may be similar to the cross-section view of LIDAR 400 shown in FIG. 4C. For example, axis 515 shown in FIG. 5 may extend through (and may be perpendicular to) the page, similarly to axis 415 shown in FIG. 4C.

As shown, LIDAR 500 includes a rotating platform 510, a transmitter 520, a primary emitter 522, a transmit lens 540, a mirror 544, optical windows 548 and 549, and a housing 550, that are similar, respectively, to rotating platform 410, transmitter 420, emitter 422, transmit lens 440, mirror 444, optical windows 448 and 449, and housing 450 of LIDAR 400. Further, it is noted that LIDAR 500 may include one or more additional components (e.g., actuator, receiver, stationary platform, etc.) similar to one or more of the components described in system 100 and/or LIDARs 200-400.

As shown, LIDAR 500 also includes secondary emitters 524 and 526, each of which may be similar to secondary emitter 324 of LIDAR 300. For example, as shown, secondary emitter 524 may be configured to emit a wide light beam 580 to illuminate a relatively larger portion of a scene (scanned by LIDAR 500), as compared to a portion of the scene that is illuminated by a (narrower) primary light beam 560 (e.g., similar to emitted beam 460) emitted using primary emitter 522. For example, as shown, emitted beam 580a may diverge within a greater range of angles between dashed lines 580a and 580b (as compared to the smaller range of divergence angles of beam 560 between dotted lines 560a and 560b). Further, as shown, at least a portion of the secondary beam 580 may illuminate a target region in the environment of LIDAR 500 that is also illuminated by primary beam 560.

Thus, in some examples, secondary emitter 524 may be configured as a wide field illuminator that illuminates a large portion of the scene overlapping with multiple target regions that can be illuminated by primary beam 560 through optical window 548 (i.e., for a variety of rotational positions of mirror 544 about axis 515).

Similarly, in some examples, secondary emitter 526 may also emit a secondary light beam (not shown) to illuminate portions of the scene which would also be illuminated by primary beam 560 when mirror 544 steers primary beam 560 out of optical window 549 (instead of optical window 548).

In the example shown, secondary emitters 524 and 526 are disposed outside the optical cavity defined by housing 550 (and by optical windows 548-549). With this arrangement for instance, noise signals associated with secondary emitted light 580 can be reduced.

In alternative examples, the secondary emitters 524 and/or 526 can be instead disposed inside housing 550. In a first example, secondary emitter 524 (and/or 526) can be alternatively positioned adjacent or near transmit lens 540 such that light beam 580 is reflected by mirror 544 toward the scene (similarly to light beam 560). In a second example, secondary emitter 524 (and/or 526) can be alternatively positioned inside transmitter 520 and configured to emit light beam 580 toward emitter 522. In this example, a portion of the emitted light beam 580 could then: reflect off emitter 522 toward lens 540, propagate out of transmitter 520 (through lens 540) toward mirror 544, and reflect off mirror 544 toward the FOV of LIDAR 500. Thus, in this example, light beam 580 (or a portion thereof) could be transmitted by LIDAR 500 along an optical path that is similar to the optical path of light beam 560. In a third example, secondary emitter 524 (and/or 526) can be arranged to emit light beam 580 out of housing 550 (e.g., through optical window 548 and/or 549) without reflecting light beam 580 at mirror 544. For instance, emitter 524 can be arranged to direct a wide-field beam 580 out of window 548 (i.e., without first reflecting the light beam 580 off mirror 544). Other examples are possible.

In the example shown, secondary emitters 524 and 526 may be disposed on an outside surface of housing 550. With this arrangement for instance, secondary emitters 424 and 526 may rotate together with housing 550 as rotating platform 510 rotates housing 550 (e.g., about a vertical axis perpendicular to axis 515, etc.). In alternative examples, secondary emitters 524-526 can be instead mounted to a stationary component (not shown) of device 500 (e.g., similar to stationary platform 412 of LIDAR 400, etc.), such that secondary emitters 524-526 do not rotate with the rotation of platform 510.

In some embodiments, LIDAR 500 may include a single secondary emitter instead of the two secondary emitters 524 and 526. For example, a single wide-field emitter can be configured to transmit a wide-field light beam that extends away from both sides of housing 550 (where optical windows 548 and 549 are located). For instance, the single emitter can be mounted on a bottom side of housing 550 (i.e., between the locations shown in FIG. 5 for emitters 524 and 526).

III. EXAMPLE METHODS AND TIMING DIAGRAMS

It is noted that the arrangements described for LIDARs 200-500 are not meant to be limiting, but are provided for the sake of example. Thus, the methods and processes described herein can be used with a variety of different LIDAR configurations, including LIDAR devices 200-500 as well as other types of LIDARs. Additionally, the methods and processes described herein can be used with a variety of different types of active sensors such as any of the active sensing systems in the description of system 100 in addition to or instead of LIDARs.

Figure 6:
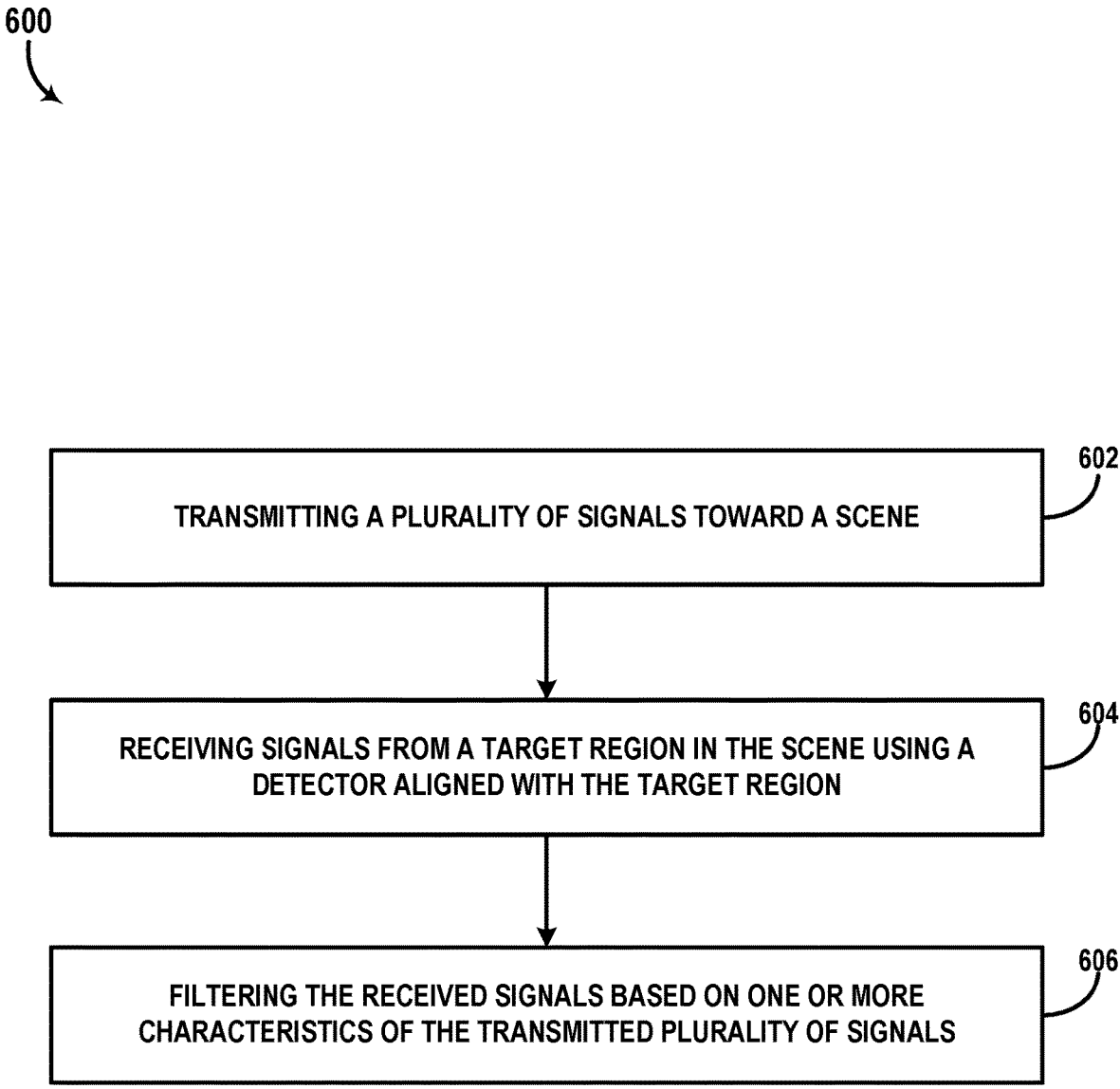
FIG. 6 is a flowchart of a method, according to example embodiments.

FIG. 6 is a flowchart of a method 600, according to example embodiments. Method 600 presents an embodiment of a method that could be used with any of system 100 and/or devices 200-500, for example. Method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 600 and other processes and methods disclosed herein, each block in FIG. 6 may represent circuitry that is wired to perform the specific logical functions in the process.

At block 602, method 600 involves transmitting a plurality of signals toward a scene. For example, transmitter 120 can be configured to emit (and/or direct, collimate, focus, etc.) one or more pulses (e.g., light, sound, radio waves, etc.) toward one or more target regions in the scene.

In some examples, the plurality of transmitted signals (e.g., pulses, beams, etc.) may include one or more primary signals and one or more secondary signals. Each primary signal may illuminate a target region in the scene according to a signal intensity (or power density) that is greater than a primary threshold. Each secondary signal (or a portion thereof) may illuminate the target region according to a signal intensity (or power density) that is less than a secondary threshold. Various primary threshold and secondary threshold values are possible. In one embodiment, the primary threshold is at least double the secondary threshold. In another embodiment, the primary threshold is at least one hundred times the secondary threshold (i.e., [primary threshold]>100*[secondary threshold]). In yet another embodiment, the primary threshold is at least one thousand times the secondary threshold (i.e., [primary threshold]>1000*[secondary threshold]). Other primary threshold and/or secondary threshold values are possible as well.

The primary threshold, for example, can be based on a minimum intensity that is detectable by a detector aligned with the target region, and on an expected intensity of a reflected portion of the primary signal (e.g., reflected off a typical reflective surface within a scanning range of a system of method 600) that returns to the detector from the target region. Referring back to FIG. 4D for example, detector 432 may have a sensitivity characteristic suitable for reliable detection of intercepted light having at least the minimum intensity. Further, the intensity of light 470 at the location of detector 432 may depend on the distance between LIDAR 400 and the object in the scene that reflected light 470 toward LIDAR 400. Further, the intensity of light 470 may be further attenuated by window 448, mirror 444, lens 442, diaphragm 446, and/or any other optical element (e.g., filter, external object, etc.) along an optical path of light 470. Thus, the primary threshold can be selected such that primary signal 460 (shown in FIG. 4C) has a sufficient amount of energy or intensity such that an expected signal intensity of a reflected portion 470 of the primary signal (e.g., assuming the primary signal is reflected by a typical reflective surface within a predetermined scanning range of LIDAR 400, such as 200 meters for instance).

The secondary threshold on the other hand, for example, can be selected such that each secondary signal has less than the sufficient amount of energy or intensity for a reflected portion thereof to be detected by detector 432 (when reflected by a typical reflective surface, i.e., not a retroreflector) while still being sufficient for detection if the reflected portion was instead reflected by a retroreflector (or other type of strong reflector). Thus, in some examples, secondary signals can be used for scanning the scene for retroreflectors.

For example, a system of method 600 may be configured to estimate ranges (and/or intensities) of bright objects (e.g., retroreflectors) in the scene based on detected reflections of the secondary signals (instead of using detected reflections of primary signals from the bright objects). In this instance, the detected reflections of the primary signals from such bright objects may cause measurement errors by a receiver of the LIDAR (e.g., saturation errors). As such, the system can more accurately estimate the ranges (and/or intensities) of the bright objects by using detected signals corresponding to reflections of secondary signals instead of detected signals corresponding to reflections of primary signals off the bright objects.

In some examples, method 600 may involve emitting secondary signals according to one or more secondary thresholds. For instance, a system of method 600 may be configured to emit: a first secondary signal having a first intensity (or power) that is less than a first secondary threshold; and a second secondary signal having a second intensity (or power) that is less than a second (relatively lower) secondary threshold. In this way, for instance, the system could further distinguish received signals that correspond to reflections of primary signals from received signals that correspond to reflections of secondary signals.

In a first example, emitting the secondary signals may involve selecting a secondary threshold based on a dynamic range of a LIDAR device of method 600 (e.g., range of distances from which returning signals can be used to reliably/accurately estimate target ranges and/or signal intensities). The dynamic range could vary (at least temporarily) during operation for various reasons, such as saturation of a receiver of the LIDAR, and/or changes in the environment of the LIDAR (e.g., background noise, sunlight, temperature, etc.), among other reasons. As such, in the first example, the LIDAR could select secondary signal intensities that are suitable for scanning portion(s) of the scene outside the dynamic range (e.g., instead of or in addition to using primary signals to scan these portions).

In a second example, emitting the secondary signals may involve adjusting the secondary threshold in response to detection of inter-channel cross-talk errors in a previous scan of the scene. Referring back to FIG. 3B for instance, consider a scenario where LIDAR 300 detects a cross-talk error (e.g., interference, etc.) between a first channel that transmits primary beam 361 and a second channel that transmits primary beam 362. In this scenario, during a subsequent scan of FOV 360, LIDAR 300 could emit a secondary beam (e.g., similar to beam 367) for scanning portion(s) of FOV 360 associated with these channels (e.g., instead of or in addition to emitting primary beams toward these portions). Additionally, LIDAR 300 could optionally adjust an intensity of the secondary beam of the second scan (e.g., adjusted intensity that is: sufficiently high for reliable detection of returning reflections of the secondary beam at the first and/or second channel(s); and/or sufficiently low to avoid or reduce the likelihood of saturating the receiver of the LIDAR).

In some examples, a same emitter can be used for transmitting primary and secondary signals. Referring back to FIG. 2B for example, LIDAR 200 can emit a primary signal using a particular emitter to illuminate the target region associated with beam 261 at a high intensity (or power), and emit a secondary signal (at a lower intensity or power) using the same particular emitter to illuminate the same target region associated with beam 261.

In other examples, a primary emitter can be used to emit primary signals and a physically separate secondary emitter can be used to emit secondary signals. Referring back to FIGS. 3A-3B for example, a primary emitter inside housing 350 (shown in FIG. 3A) can be used to emit primary signal 361 (shown in FIG. 3B), and a physically separate secondary emitter 324 (shown in FIG. 3A) can be used to emit a secondary signal 367 (shown in FIG. 3B). In this example, as shown in FIG. 3B, a portion of secondary signal 367 may illuminate the same target region illuminated by primary signal 361.

At block 604, method 600 involves receiving signals from a target region in the scene using a detector aligned with the target region. Referring back to FIGS. 4C-4D for example, detector 432 (shown in FIG. 4D) can be aligned with emitter 422 (shown in FIG. 4C) to intercept a portion of light from the scene that includes light from the target region illuminated by emitter 422. For example, diaphragm 446 (shown in FIG. 4D) may include an aperture positioned to transmit a portion of the light focused by receive lens 442 toward detector 432. For instance, the transmitted portion (through the aperture) may include light from the target region (e.g., reflected light 470) illuminated by emitter 422.

At block 606, method 600 involves filtering the received signals based on one or more characteristics of the transmitted plurality of signals.

In a first example, filtering the received signals at block 606 may involve identifying an object in the target region as a retroreflector. For instance, a given signal may be identified as being a reflected portion of a secondary signal of the transmitted signals. Thus, in this instance, the object that reflected the secondary signal may be identified as a retroreflector because a different type of reflector would not be expected to reflect a sufficient portion of the secondary signal that is detectable by the detector.

In a second example, filtering the received signals at block 606 may involve identifying an invalid signal or other error signal that is not associated with a reflection of a transmitted signal by an object within a given distance to a system of method 600. The given distance, for instance, may be a predetermined scanning range (e.g., 200 meters, etc.) of the system. For instance, the system may be configured to listen for reflections of the transmitted pulses during a detection period that begins after emission of the transmitted pulses. To achieve a 150 meter scanning range by a LIDAR for instance, the detection period may be selected as approximately 1,000 nanoseconds (i.e., approximate amount of time in which light would travel for 150 meters away from LIDAR, and then 150 meters back to LIDAR).

In one scenario, the invalid signal may correspond to a light pulse that is detected from an object or source out of the predetermined scanning range (e.g., reflected by a distant retroreflector, etc.). For instance, where the scanning range of a LIDAR is 150 meters, the LIDAR may transmit a first signal toward the target region; then monitor the target region during a first detection period of 1,000 nanoseconds for reflections of the first signal; then transmit a second signal toward the target region; then monitor the target region for a second detection period of 1,000 nanoseconds. If a retroreflector is at a distance of 200 meters away, the invalid signal may correspond to a reflection of the first signal from the retroreflector that is received during the second detection period (instead of the first detection period).

In another scenario, the invalid signal may correspond to a spurious signal transmitted by another light source within the predetermined scanning range (e.g., interference from a nearby active sensor, etc.).

To facilitate identifying the invalid signal, in some implementations, filtering the received signals at block 606 may involve comparing emission times and/or intensities of the plurality of transmitted signals with receipt times and/or intensities of the received signals. In an example scenario, a LIDAR device may emit a secondary signal at t=0 nanoseconds and a primary signal at t=50 ns, and then receive two signals at t=1,000 nanoseconds and at t=1,100 nanoseconds. In this example, one or both of the received signals may be identified as potential invalid signals based on a delay between the two receipt times (1100−1000=100 nanoseconds) being different from a delay between the two emission times (50−0=50 nanoseconds).

Figure 7:
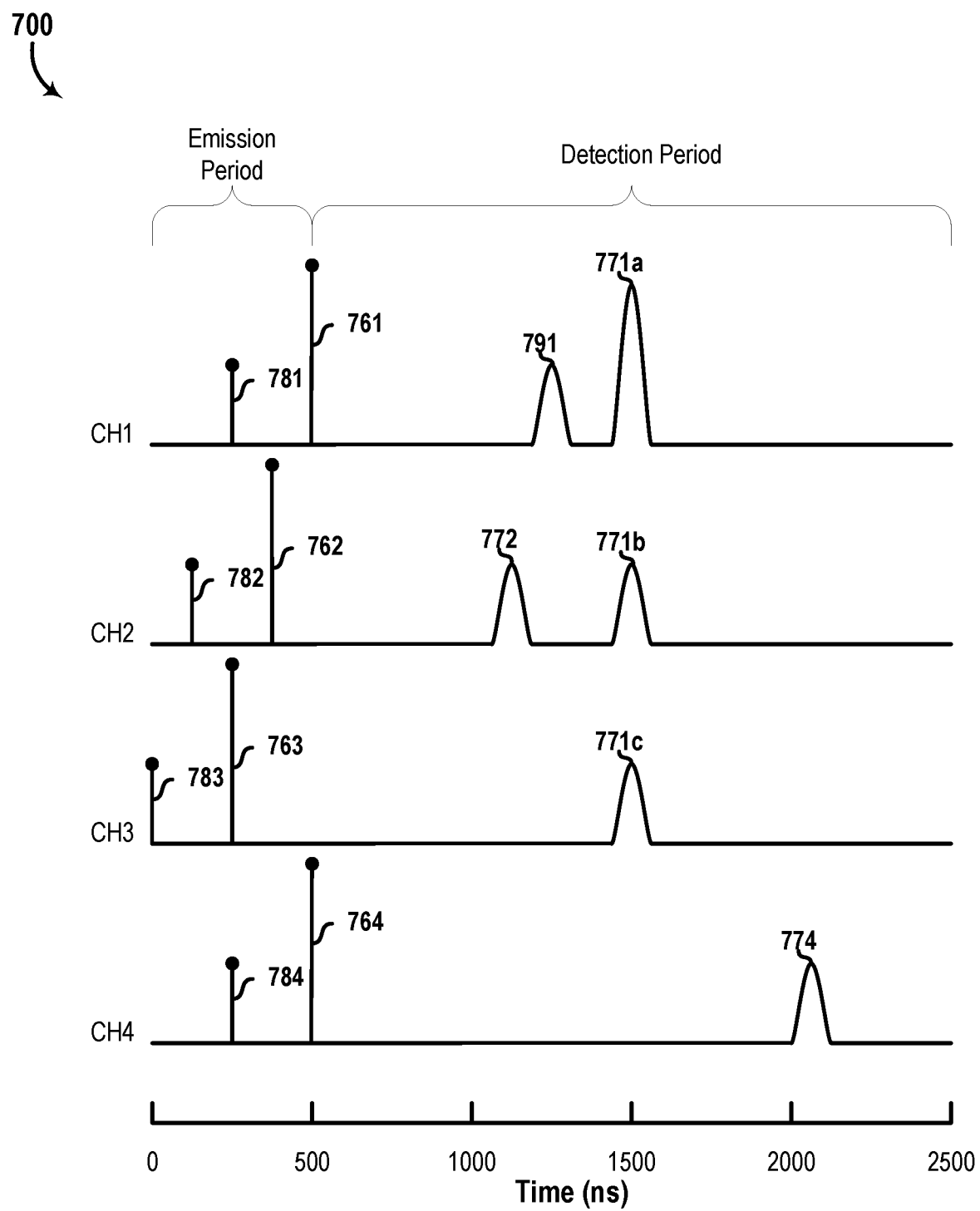
FIG. 7 illustrates conceptual timing diagrams for a first scan of a FOV, according to example embodiments.

FIG. 7 illustrates conceptual timing diagrams for a first scan 700 of a FOV, according to example embodiments. In particular, FIG. 7 shows timing diagrams for transmit/receive signals associated with multiple channels (labeled as CH1, CH2, CH3, CH4) of an example device or system herein (e.g., system 100, devices 200-300, etc.). Each channel may be configured to scan a respective portion of a scene. Referring back to FIG. 3B for example, transmit signal 761 of CH1 may indicate emission of a primary pulse or beam 361 at t=500 nanoseconds (ns), transmit signal 762 of CH2 may indicate emission of beam 362 at t=375 ns, transmit signal 763 of CH3 may indicate emission of beam 363 at t=250 ns, and transmit signal 764 of CH4 may indicate emission of beam 364 at t=500 ns.

In some examples, each channel may also transmit a secondary signal (e.g., using the same respective emitter that emitted the respective primary signal) having a lower intensity than the primary signal. As shown for example, CH1 may transmit a secondary signal 781 at t=250 ns, CH2 may transmit a secondary signal 782 at t=125 ns, CH3 may transmit a secondary signal 783 at t=0 ns, and CH4 may transmit a secondary signal 784 at t=250 ns.

Thus, in some examples, a system herein may scan respective portions of a scene using a spatial arrangement of transmit/receive channels that emit primary signals at varying (e.g., dithered, etc.) times within an emission time period of first scan 700. In the scenario shown, an emission time period (500 ns) of first scan 700 may have a start time of t=0 ns and an end time of t=500 ns.

Alternatively, in other examples, the emission times of primary signals 761-764 may instead be substantially same as one another (e.g., signals 761-764 may all have a same emission time of t=500 ns, etc.).

As shown, a detection time period (2000 ns) of first scan 700 begins after the emission period ends (at t=500 ns). During the detection time period (e.g., from t=500 ns to t=2500 ns), each channel may listen for returning reflections of its respective transmitted signal. For instance, in the scenario shown, CH1 may detect receive signal 771a at t=1500 ns, and receive signal 791 at t=1250 ns. Thus, an example system or device herein may determine a distance "d" to an object that reflected a particular receive signal detected by a particular channel as:

$$d = c^*(\text{channel\_detection\_time} - \text{channel\_emission\_time})/2;$$

where c is the speed of light (and/or other signal type of transmit signal 602 such as sound, etc.). Thus, for CH1 in this scenario (assuming that receive signal 771a is associated with a reflection of primary signal 761), d=c*(1500 ns−500 ns)/2≈150 meters. In turn, an example system that performs first scan 700 may determine that an object is present in the portion of the FOV scanned by CH1 at a distance of 150 meters from the system. Similarly, the system can determine distances to objects present in respective target regions scanned by CH2, CH3, CH4 based on the respective channel emission times (e.g., of primary signals 762, 763, 764) and the respective channel detection times.

In some scenarios however, a reflected portion of a primary signal of a first channel may be spuriously detected by a second channel. For instance, in a scenario where a retroreflector (or other strong reflector) is scanned by the first channel, portions of the reflected signal from the retroreflector may have sufficient energy to be detected by the second channel as well (e.g., due to physical proximity of the scanned target regions, etc.).

For example, consider a scenario where primary signal 761 is reflected by a retroreflector and detected at CH1 as a (relatively strong) receive signal 771a. In this scenario, portions of the reflected signal from the retroreflector may also be detected spuriously at CH2 and CH3 as, respectively, (relatively weaker) receive signals 771b and 771c. In some examples, the (spurious) receive signals 771b and 771c may interfere with (and/or prevent) detection of non-spurious receive signals (not shown) that also arrive at t=1500 ns in CH2 and CH3. Additionally, the spurious signals 771b and 771c may be confused with true reflections of, respectively, primary signals 762 and 763. For instance, it may be unclear if receive signal 771c is a spurious signal associated with the retroreflector in CH1 or a reflection of primary signal 763 of CH3 (off an object that is not a retroreflector).

Thus, in some examples, a system herein may identify invalid signals associated with retroreflectors by emitting secondary signals 781-784. For instance, in the scenario shown, the object associated with receive signal 771a can be identified as a retroreflector because a reflected portion of secondary signal 781 was also detected at CH1. An example system herein may confirm that receive signal 791 is associated with a reflection of secondary signal 781, for instance, by comparing a delay between emission times of transmit signals 761 and 781 (i.e., 500 ns−250 ns=250 ns) to a delay between receipt times of signals 771a and 791 (i.e., 1500 ns−1250−ns=250 ns). Whereas, for instance, the system may determine that the object associated with receive signal 774 of CH4 is not a retroreflector because a reflection of secondary signal 784 was not detected in CH4.

Additionally or alternatively, the example system may determine that receive signal 771b is potentially an invalid signal due to a delay between receipt times of signals 772 and 771*b* (1500−1125=375 ns) being different than a delay between emission times of signals 762 and 782 (375−125=250 ns).

However, it is noted that the discrepancy between the two delays may not necessarily indicate that receive signal 771*b* is an invalid signal. For instance, the delays may be different due to transmit signal 762 reflecting off two actual targets located at two different ranges (or distances) in the region of the FOV scanned by CH2. Thus, in this instance, the two receive signals 772 and 771*b* may correspond to two separate (non-spurious) returning signals from the two targets.

Accordingly, in some examples, the system may determine whether receive signal 771*b* is an invalid signal further based on one or more other signal detections. In one example, the system may confirm whether signal 771*b* is an invalid signal further based on a determination that one or more signal(s) (e.g., signals 771*a*, 771*c*, etc.) were also detected in other channel(s) at a substantially same time (e.g., t=1500 ns) as signal 771*b*. In another example, the system may analyze neighboring points in the point cloud representation generated using the LIDAR device for other scanning errors indicative of the presence of a retroreflector, such as saturation errors (e.g., same retroreflector appears to be present at multiple ranges or distances away from the LIDAR), and/or blooming errors (e.g., the retroreflector appears to be enlarged in the point cloud), among other possibilities.

In some examples, upon identification of the object scanned by CH1 as a retroreflector, the system can also identify receive signals 771*b* of CH2 and 771*c* of CH3 (having a same receipt time as signal 771*a*) as potential invalid signals.

Figure 8:
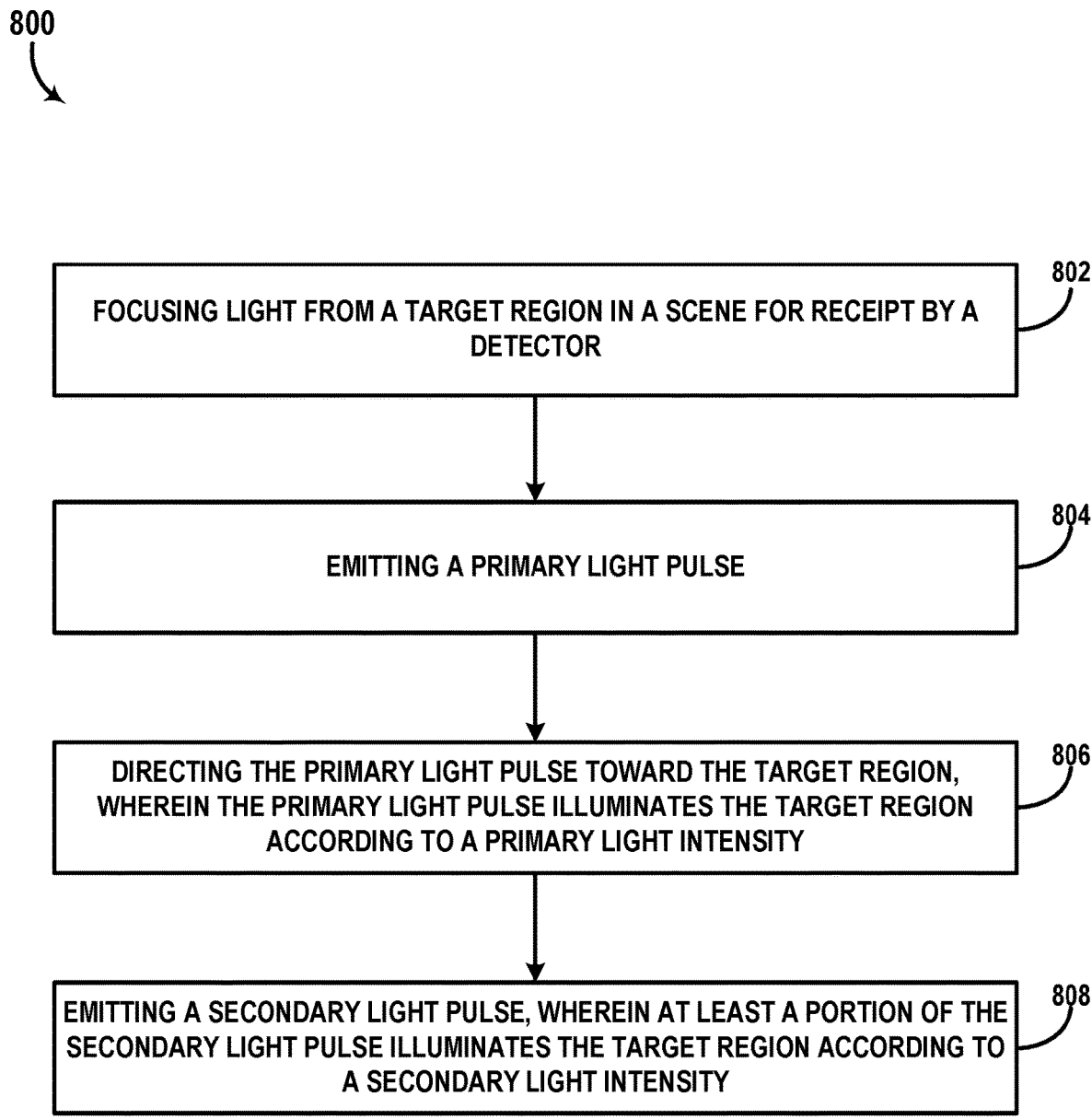
FIG. 8 is a flowchart of another method, according to example embodiments.

FIG. 8 is a flowchart of another method 800, according to example embodiments. Method 800 presents an embodiment of a method that could be used with any of system 100, devices 200-500, and/or method 600, for example. Method 800 may include one or more operations, functions, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, method 800 involves focusing light from a target region in a scene for receipt by a detector. For example, as shown in FIG. 4D, receive lens 442 may focus light from the scene, and a portion of the focused light that includes light from the target region may be transmitted (e.g., selected via diaphragm 446) for receipt by emitter 432.

At block 804, method 800 involves emitting a primary light pulse. In some examples, the primary light pulse may be similar to the primary signal(s) described in connection with block 602 of method 600. In a first example, as shown in FIG. 2B, LIDAR 200 may emit primary light pulse 261 to illuminate the target region defined by a beam width of primary light pulse 261. In a second example, as shown in FIG. 4C, LIDAR 400 may emit primary light pulse 460 to illuminate the target region of the scene between arrows 460*a* and 460*b*. For instance, transmitter 420 (shown in FIG. 4C) and receiver 430 (shown in FIG. 4D) can be disposed in a particular relative physical arrangement such that focused light portion 470 (intercepted by detector 432 of receiver 430) includes light from the target region illuminated by emitted light 460 (emitted by emitter 422 of transmitter 420).

At block 806, method 800 involves directing the primary light pulse toward the target region. The primary light pulse may illuminate the target region according to a primary light intensity. As shown in FIG. 4C for example, LIDAR 400 includes one or more optical elements (i.e., transmit lens 440, mirror 444, and optical window 448) that together direct emitted light 460 (emitted by emitter 422) toward the target region of the scene between 460*a* and 460*b*. In some examples, directing the primary light pulse at block 806 may be similar to the transmission of the primary signals described at block 602 of method 600. For example, the primary light intensity may be greater than the primary threshold described at block 602.

At block 808, method 800 involves emitting a secondary light pulse. At least a portion of the secondary light pulse may illuminate the target region according to a secondary light intensity. In some examples, the secondary light pulse may be similar to the secondary signals described at block 602 of method 600. For example, the secondary light intensity may be less than the secondary threshold described at block 602.

Additionally or alternatively, in some examples, one or more modulation characteristics of the secondary light pulse and the primary light pulses can be varied in different ways. In a first example, a system of method 800 may modulate a pulse length of the primary light pulse differently than a pulse length of the secondary light pulse. In one embodiment, the secondary light pulse may have twice the pulse length of the primary light pulse. Other pulse lengths and/or modulation characteristics are possible as well.

In some examples, method 800 may involve detecting an object in the scene based on the detector indicating detection of a reflected portion of the primary light pulse in the focused light. Referring back to FIG. 7 for example, a system of method 800 may determine that an object is present at a distance of 150 meters in the target region scanned by CH1 (e.g., the target region illuminated by beam 261 shown in FIG. 2B, etc.) based on detection of the reflected portion (e.g., signal 771*a*) of the primary pulse associated with signal 771*a* of CH1.

In some examples, method 800 may involve identifying the detected object as a retroreflector based on the detector indicating detection of a reflected portion of the secondary light pulse in the focused light. Continuing with the example of FIG. 7, the object associated with receive signal 771*a* may be identified as a retroreflector based on detection (e.g., receive signal 791) of a reflection of the secondary pulse (e.g., associated with secondary signal 781).

More generally, in some examples, method 800 may involve identifying a reflectivity characteristic of the detected object based on a determination of whether a reflection of the secondary light pulse reflected off the object is detected by the detector. For example, the reflectivity characteristic may relate to whether the object is a strong reflector (e.g., mirror), a retroreflector, or other type of material. Continuing with the example of FIG. 7 for instance, the intensities of the received signals 791 and 771*a* (relative to the intensities of the emitted signals 781 and 761) can be analyzed to determine the reflectivity characteristic of the object.

In some examples, method 800 may involve transmitting the primary light pulse toward the target region as a first light beam having a first beam divergence, and transmitting the secondary light pulse toward the scene as a second light beam having a second beam divergence that is greater than the first beam divergence. Referring back to FIG. 5 for example, the first beam divergence of primary light beam 560 (i.e., angle between arrows 560a) may be greater than the second beam divergence of secondary beam 580 (i.e., angle between arrows 580a and 580b). Thus, for instance, while secondary beam 580 may have a beam width sufficient to overlap the target region illuminated by primary beam 560, the intensity of the portion of secondary beam 580 that illuminates the target region may be lower (e.g., due to the energy of the secondary beam being spread over a wider range of angles as compared to the primary beam).

In these examples, method 800 may optionally involve collimating the primary light pulse to provide the first light beam having the first beam divergence. Continuing with the example of FIG. 5 for instance, transmit lens 540 may collimate primary light pulse 560 (emitted by emitter 522) into the relatively narrower first light beam (extending between arrows 560a and 560b).

In some examples, emitting the primary light pulse at block 804 may comprise emitting the primary light pulse using a primary emitter; and emitting the secondary light pulse at block 808 may comprise emitting the secondary light pulse using a secondary emitter. As shown in FIG. 5 for example, primary light pulse 560 is emitted using primary emitter 522; and secondary light pulse 580 is emitted using secondary emitter 524.

In some examples, method 800 involves transmitting the primary light pulse along a first optical path that includes one or more optical elements, and transmitting the secondary light pulse along a second optical path that does not include the optical elements. As shown in FIG. 5 for example, primary light pulse 560 is emitted along the first optical path that includes transmit lens 540, mirror 544, and optical window 548; whereas secondary light pulse 580 is transmitted through the second optical path (that does not include transmit lens 540, mirror 544, or optical window 548).

In some examples, method 800 involves emitting the secondary light pulse prior to emitting the primary light pulse. Referring back to FIG. 7 for example, the secondary light pulse associated with transmit signal 781 is emitted (e.g., at t=250 ns) prior to emission (e.g., at t=500 ns) of the primary light pulse associated with signal 761.

In these examples, method 800 may optionally involve emitting the primary light pulse at block 804 based on the detector not detecting a reflection of the secondary light pulse within a threshold period of time after emission of the secondary light pulse.

For example, a system or device herein may emit the secondary light pulse and then listen for reflections of the secondary light pulse from a plurality of target regions during a first detection period (i.e., the threshold period of time). In this example, the system or device may then map retroreflector locations to particular target regions from which reflections of the secondary light pulse were detected (during the first detection period). The system or device may then, based on the mapping, delay or avoid primary light pulse emission toward the particular target regions and/or emit primary pulses toward other target regions that are less likely to include retroreflectors.

Figure 9A:
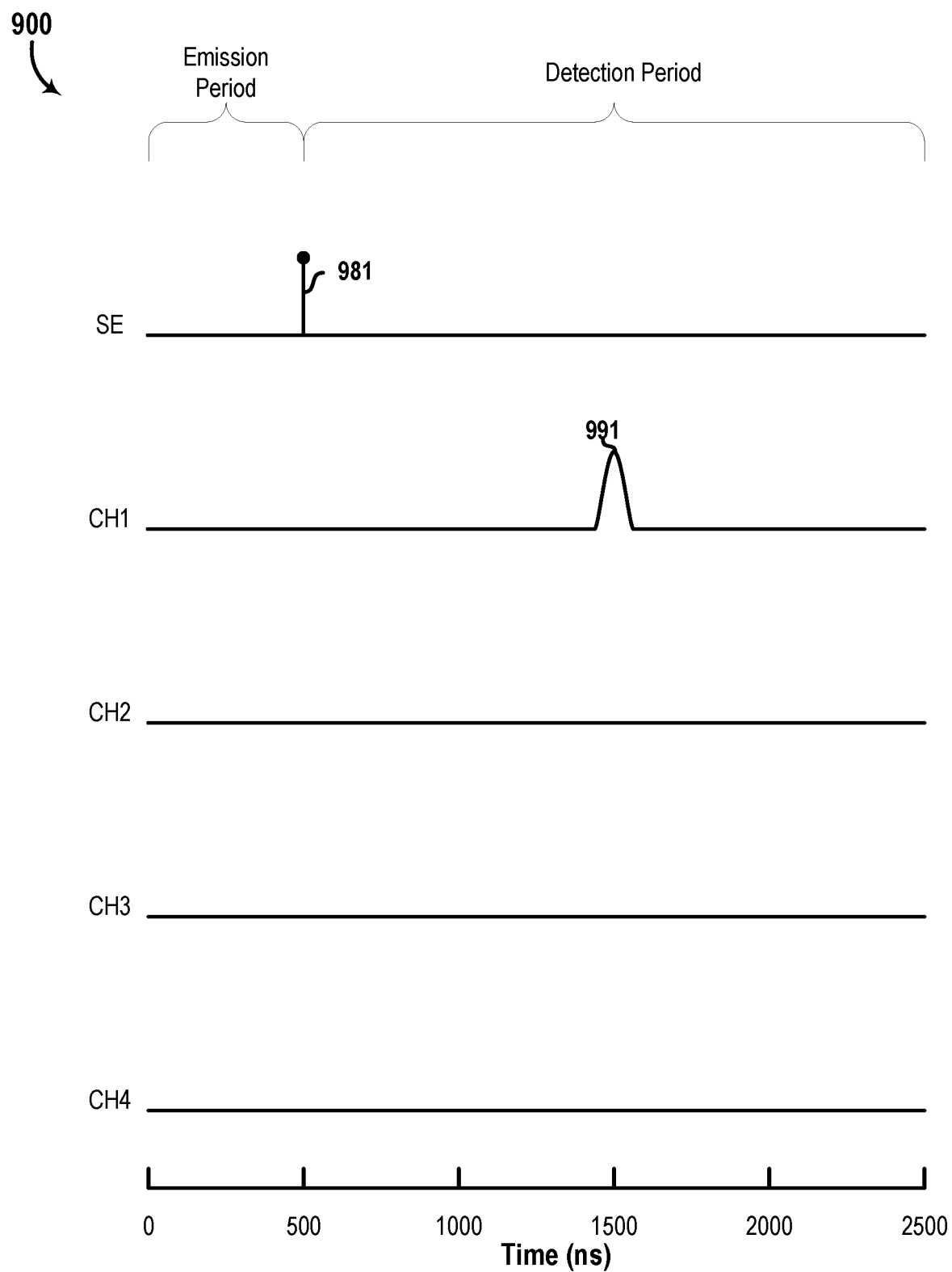
FIG. 9A illustrates conceptual timing diagrams for a first scan in a sequence of scans by a multi-channel active sensor, according to example embodiments.

FIG. 9A illustrates conceptual timing diagrams for a first scan 900 in a sequence of scans by a multi-channel active sensor, according to example embodiments.

In the scenario of FIG. 9A, a multi-channel sensor (e.g., LIDARs 200, 300, etc.) may perform a sequence of scans of a scene, where each scan has an emission period of 500 ns followed by a detection period of 2000 ns. For example, as shown, first scan 900 may include a first emission period that begins at t=0 ns, followed by a detection period between t=500 ns and t=2500 ns. In FIG. 9A, the timing diagram labeled "SE" may indicate the times at which a secondary pulse is transmitted using a secondary emitter of the sensor; and the timing diagrams labeled "CH1," CH2," "CH3," and "CH4" may each indicate respective signals transmitted/received from a respective target region in the scene.

Referring back to FIG. 3B for example, the "SE" diagram may represent the time at which secondary pulse 367 is emitted by secondary emitter 324, and the "CH1" diagram may represent times at which signals are transmitted/received from the target region illuminated by beam 361. Similarly, CH2, CH3, and CH4 may relate to the target regions associated, respectively, with the target regions illuminated by beams 362, 363, and 364.

In the scenario shown, during first scan 900, the secondary emitter emits a secondary pulse 981 (e.g., pulse 367 of FIG. 3B) at t=500 ns of the first emission period; and primary emitter(s) associated with CH1-CH4 do not transmit any primary signals during the first emission period. Further, in this scenario, the detector of CH1 may detect a reflection of the emitted secondary signal 981 at t=1500 ns (shown as receive signal 991). Thus, in this scenario, LIDAR 300 (or a controller, such as controller 104 of system 100, configured to receive data from LIDAR 300) may determine that a retroreflector is present (e.g., 150 meters away) in the target region associated with CH1, and that no retroreflectors are present in the target regions associated with CH2, CH3, CH4.

Figure 9B:
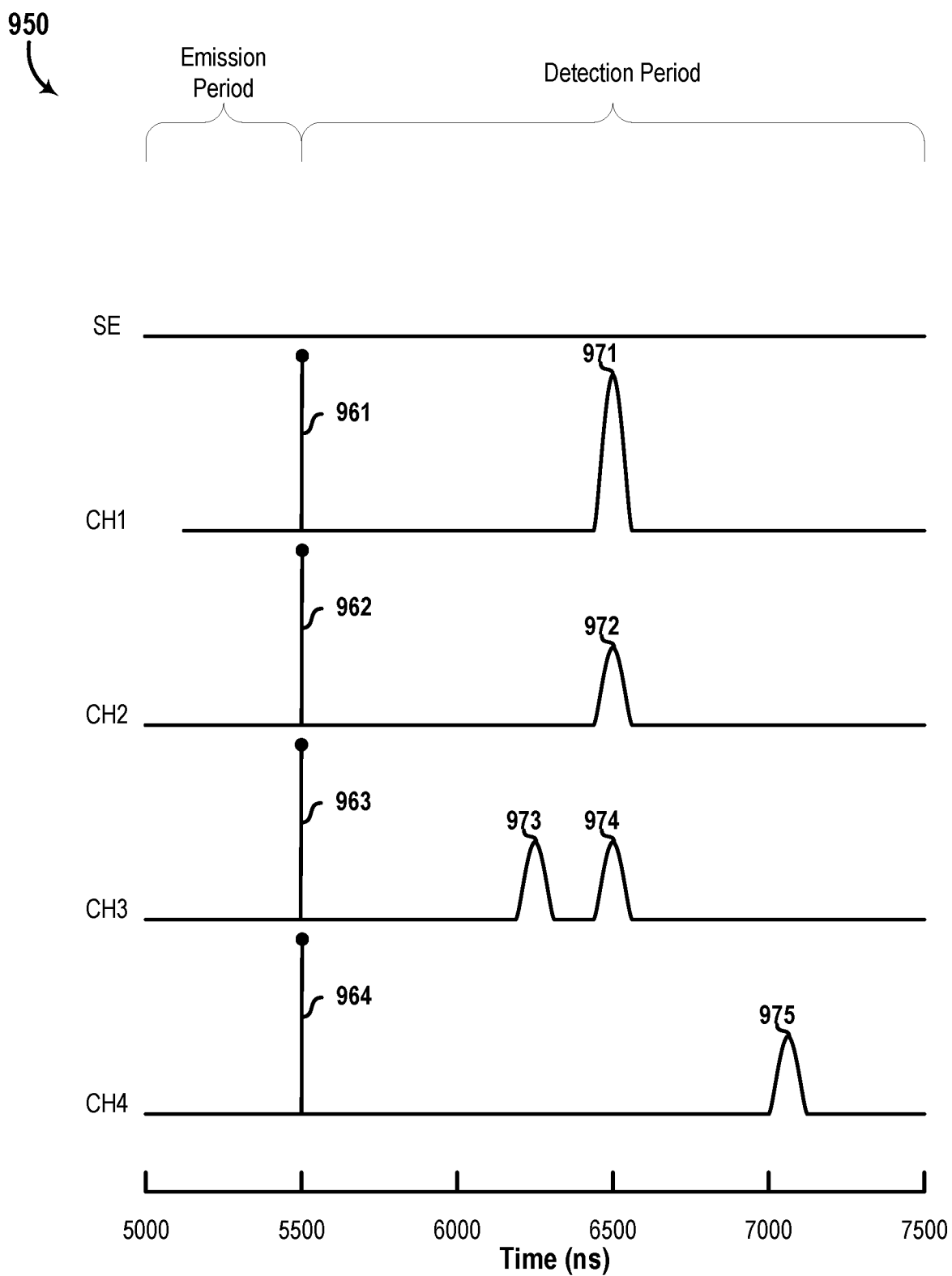
FIG. 9B illustrates conceptual timing diagrams for a second scan in the sequence of scans, according to example embodiments.

FIG. 9B illustrates conceptual timing diagrams for a second scan 950 in the sequence of scans. For example, as shown, second scan 950 has a second emission period that begins (at t=5000 ns) after the first detection period of first scan 900 ends (i.e., after t=2500n5), and a second detection period (between t=5500 ns and t=7500 ns) that follows the second emission period.

As noted in the description of FIG. 7, in some scenarios, spurious signals (e.g., 771b and 771c) may be detected at CH2 and CH3 due to the presence of a retroreflector in the target region illuminated by CH1 (e.g., where CH1 transmits a primary signal toward the retroreflector, etc.).

In the scenario of FIG. 9B for instance, CH1, CH2, CH3, CH4 may emit, respectively, primary signals 961, 962, 963, 964 during a second emission period (i.e., between t=5000 ns and t=5500 ns) of second scan 950. By way of example, as shown, primary signals 961, 962, 963, 964 may be emitted at t=5500 ns.

During the second detection time period of the second scan 950 (between t=5500 ns and t=7500 ns) in the scenario shown, CH1 receives a (relatively strong) signal 971 (at t=6500 e), which corresponds to a reflection of primary signal 961 off the retroreflector; CH2 receives signal 972 (at t=6500 ns); CH3 receives signal 973 (at t=6250 ns) and signal 974 (at t=6500 ns); and CH4 receives signal 975 (at t=7125 ns).

In line with the discussion at FIG. 7, a computing system that processes the second scan may determine that received signal 971 is likely associated with presence of the retroreflector in the region of the environment associated with CH1, and that receive signals 973 and 975 are likely associated with presence of respective objects (e.g., that are not retroreflectors) in the regions associated with, respectively, CH3 and CH4. Further, the computing system may identify received signals 972 and 974 (e.g., based on substantially same receipt times of signals 971, 972, and 974) as being potential spurious detections by CH3 and CH4 (e.g., caused by the retroreflector of CH1). However, in line with the discussion above, receive signals 972 and/or 974 may also indicate presence of objects in the corresponding regions scanned by CH2 and CH3.

Accordingly, in alternative implementations, a device or system herein may be configured to delay or avoid or weaken illuminating the target region associated with CH1 during the second scan 950 in response to detecting (e.g., based on the mapping process described in FIG. 9A) that a retroreflector may be present in the target region associated with CH1. By doing so, for instance, the example device or system may reduce or eliminate the possibility of spurious signals being detected in other channels (e.g., CH2 and CH3) due to the presence of the retroreflector in the target region of CH1.

Figure 10:
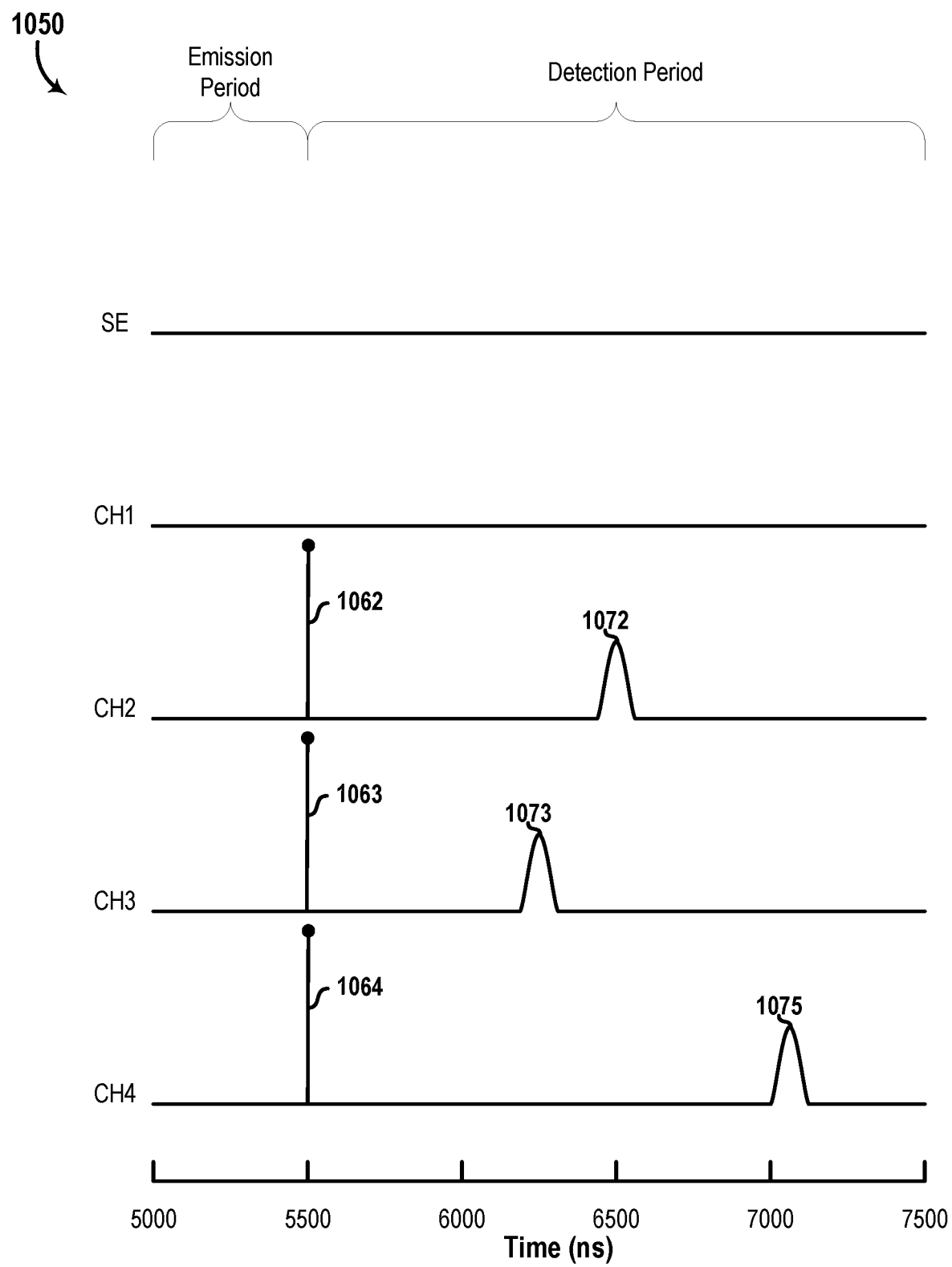
FIG. 10 illustrates conceptual timing diagrams for a first alternative implementation of a second scan in a sequence of scans, according to example embodiments.

FIG. 10 illustrates conceptual timing diagrams for a first alternative implementation of a second scan 1050 in a sequence of scans, according to example embodiments. In the scenario of FIG. 10, the second scan 1050 may be performed (e.g., by the sensor that performs the first scan 900) instead of the second scan 950, for example.

In the scenario of FIG. 10 (to prevent or reduce the spurious signal detections of CH2 and CH3 described in FIG. 9B), CH1 does not emit a primary signal during the second emission period (i.e., between t=5000 ns and t=5500 ns) of second scan 1050, while CH2, CH3, and CH4 emit primary signals 1062, 1063, and 1064, respectively, during the second emission period (at t=5500 ns) to scan their respective target regions.

Continuing with the scenario of FIG. 10, CH2, CH3, and CH4 may then detect, respectively, receive signals 1072, 1073, 1075 during the second detection period (i.e., between t=5500 ns and t=7500 ns) of the second scan 1050. Receive signals 1072, 1073, 1075 may indicate, respectively, detections of reflections of the pulses associated with transmit signals 1062, 1063, 1064 from objects in the respective target regions illuminated by CH2, CH3, CH4 (e.g., from the regions illuminated by beams 362, 363, 364 shown in FIG. 3B). A computing system (e.g., controller 104 of system 100) may then determine that objects (that are not retroreflectors) may be present in the target regions associated with CH2, CH3, CH4.

Thus, in some examples, a system or device herein may emit a secondary light pulse (prior to emitting one or more primary light pulses) to map locations of retroreflectors in the scene, and then prevent or delay illumination of a retroreflector (during a subsequent scan of the scene) based on the mapped locations of the retroreflectors.

Figure 11:
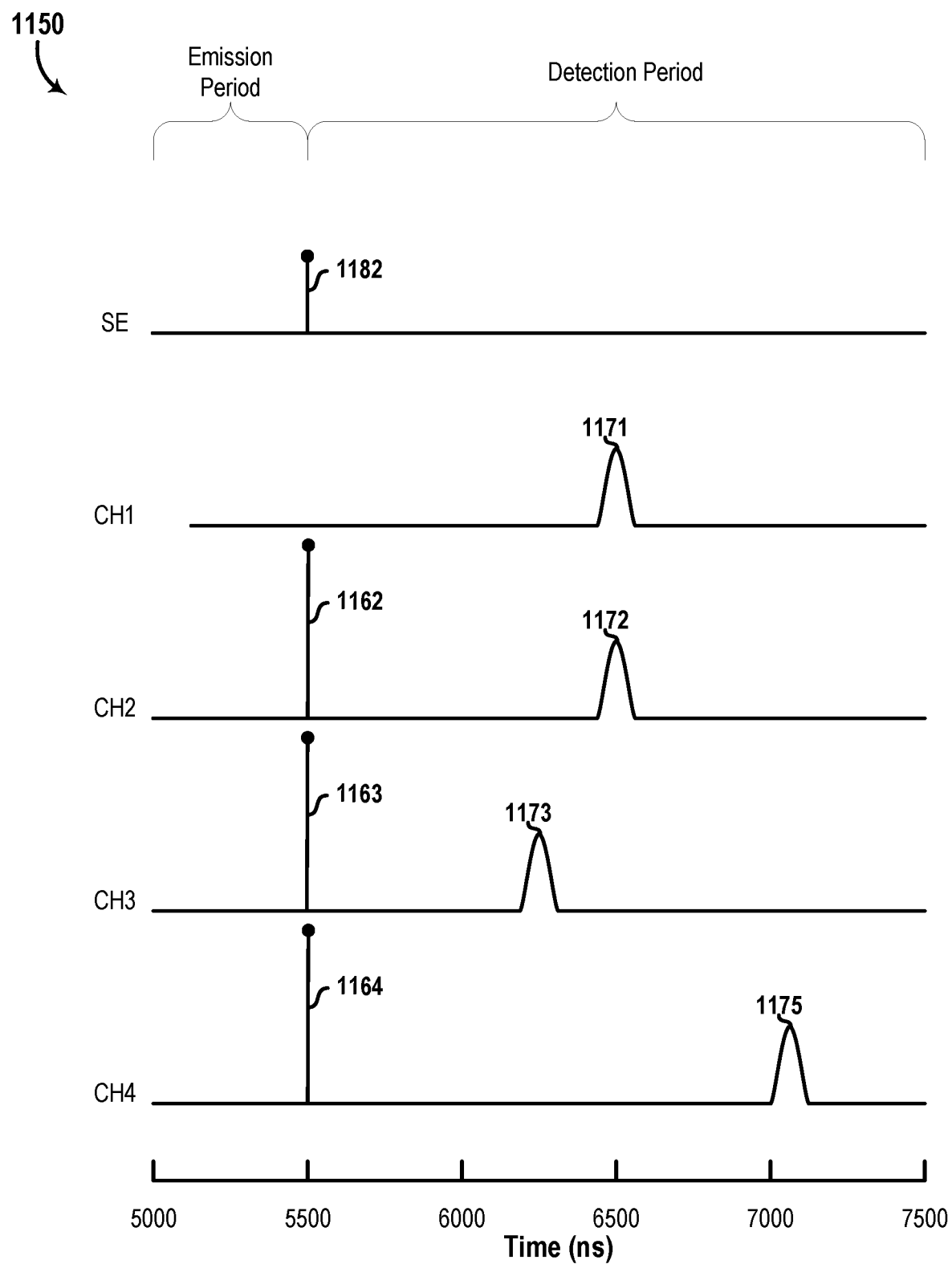
FIG. 11 illustrates conceptual timing diagrams for a second alternative implementation of a second scan in a sequence of scans, according to example embodiments.

FIG. 11 illustrates conceptual timing diagrams for a second alternative implementation of a second scan 1150 in a sequence of scans, according to example embodiments. In the scenario of FIG. 11, the second scan 1150 may be performed (e.g., by the sensor that performs the first scan 900) instead of the second scans 950 and/or 1050, for example.

In the scenario of FIG. 11 (to prevent or reduce the spurious signal detections of CH2 and CH3 described in FIG. 9B), the secondary emitter emits (at t=5500 ns) another secondary signal during the second emission period (i.e., between t=5000 ns and t=5500 ns) of second scan 1150, while CH2, CH3, and CH4 emit primary signals 1062, 1063, and 1064, respectively, during the second emission period (at t=5500 ns) to scan their respective target regions.

Thus, in this scenario, CH1 may receive a return signal 1171 (from the retroreflector), which is similar to return signal 991 of the first scan 900; and CH2, CH3, CH4 may receive, respectively, signals 1172, 1173, 1175, which are similar, respectively, to signals 1072, 1073, 1075 of the second scan 1050.

In this way, sensor data collected by CH1, CH2, CH3, CH4 can be synchronously obtained during each scan (e.g., received signals can be computed for all channels relative to a same emission time of t=5500 ns of the second scan 1150, etc.), even if one or more channels (e.g., CH1) are identified as being associated with presence of retroreflector(s). For instance, the secondary signal 1182 can be emitted with a sufficiently low intensity such that a reflected portion of signal 1161 has a sufficient amount of energy for detection at CH1 (e.g., as signal 1171) but an insufficient amount of energy for causing spurious detection(s) at the other channels (e.g., CH2 and CH3).

In one embodiment, respective intensities (or power densities) of primary signals 1162, 1163, and 1164 may be at least eight times greater than an intensity (or power density) of secondary signal 1161. In another embodiment, the respective intensities (or power densities of the primary signals may be at least 100 times greater than the intensity (or power density) of the secondary signal. In yet another embodiment, the respective intensities (or power densities of the primary signals may be at least 1000 times greater than the intensity (or power density) of the secondary signal. Other signal intensities (or power densities) are possible.

Thus, in some examples, a system or device herein may emit a secondary light pulse (prior to emitting one or more primary light pulses) to map locations of retroreflectors in the scene. Based on the mapping, during a subsequent scan of the scene, the system or device may then emit relatively stronger (e.g., primary) light pulses for scanning regions of the scene that do not include retroreflectors; and relatively weaker (e.g., secondary) light pulses for scanning other regions of the scene that include retroreflectors.

Figure 12A:
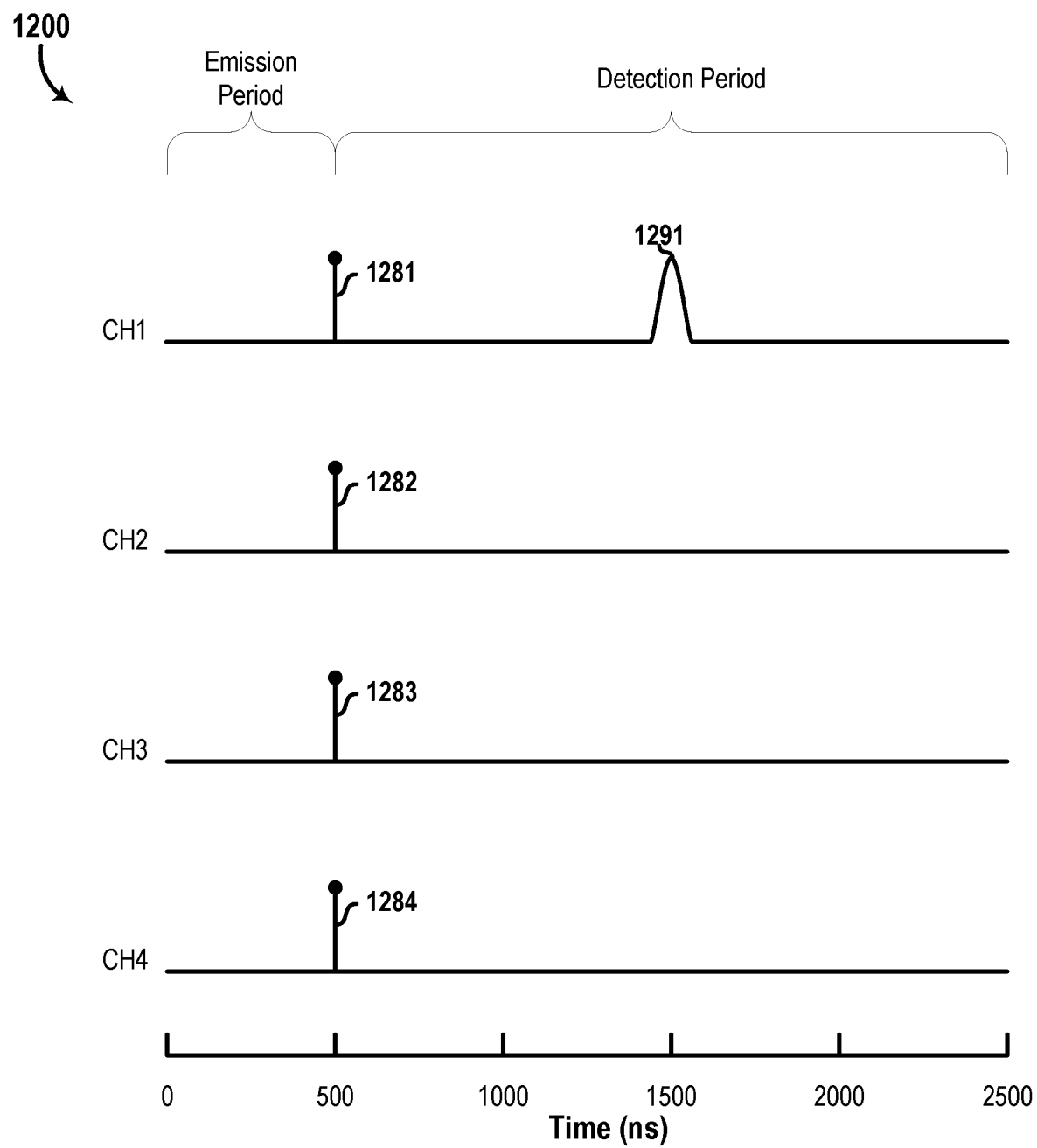
FIG. 12A illustrates conceptual timing diagrams for a first scan in another sequence of scans by another multi-channel active sensor, according to example embodiments.

FIG. 12A illustrates conceptual timing diagrams for a first scan 1200 in another sequence of scans by another multi-channel active sensor, according to example embodiments. By way of example, the first scan 1200 may be performed using a sensor, which does not use a secondary emitter for emitting secondary signals and physically separate primary emitter(s) for emitting primary signals (e.g., LIDAR 200, etc.), to map the locations of retroreflectors in a scene. To that end, CH1, CH2, CH3, CH4 shown in FIG. 12A may be similar to CH1, CH2, CH3, CH4 shown in FIG. 9A, and first scan 1200 may have a first emission period and a first detection period similarly to the first emission period and the second emission period described for first scan 900 of FIG. 9A.

In the scenario of FIG. 12A, CH1, CH2, CH3, CH4 emit, respectively, secondary signals 1281, 1282, 1283, 1284 (at t=500 ns) during the first emission period of the first scan 1200, similarly to the emission of secondary signal 981 by the secondary emitter described in connection with the first scan 900 of FIG. 9A. To that end, signal 1291 detected at CH1 may be similar to signal 991 described in FIG. 9A, and may similarly indicate presence of a retroreflector in the region of the scene scanned by CH1 during the first scan 1200.

Figure 12B:
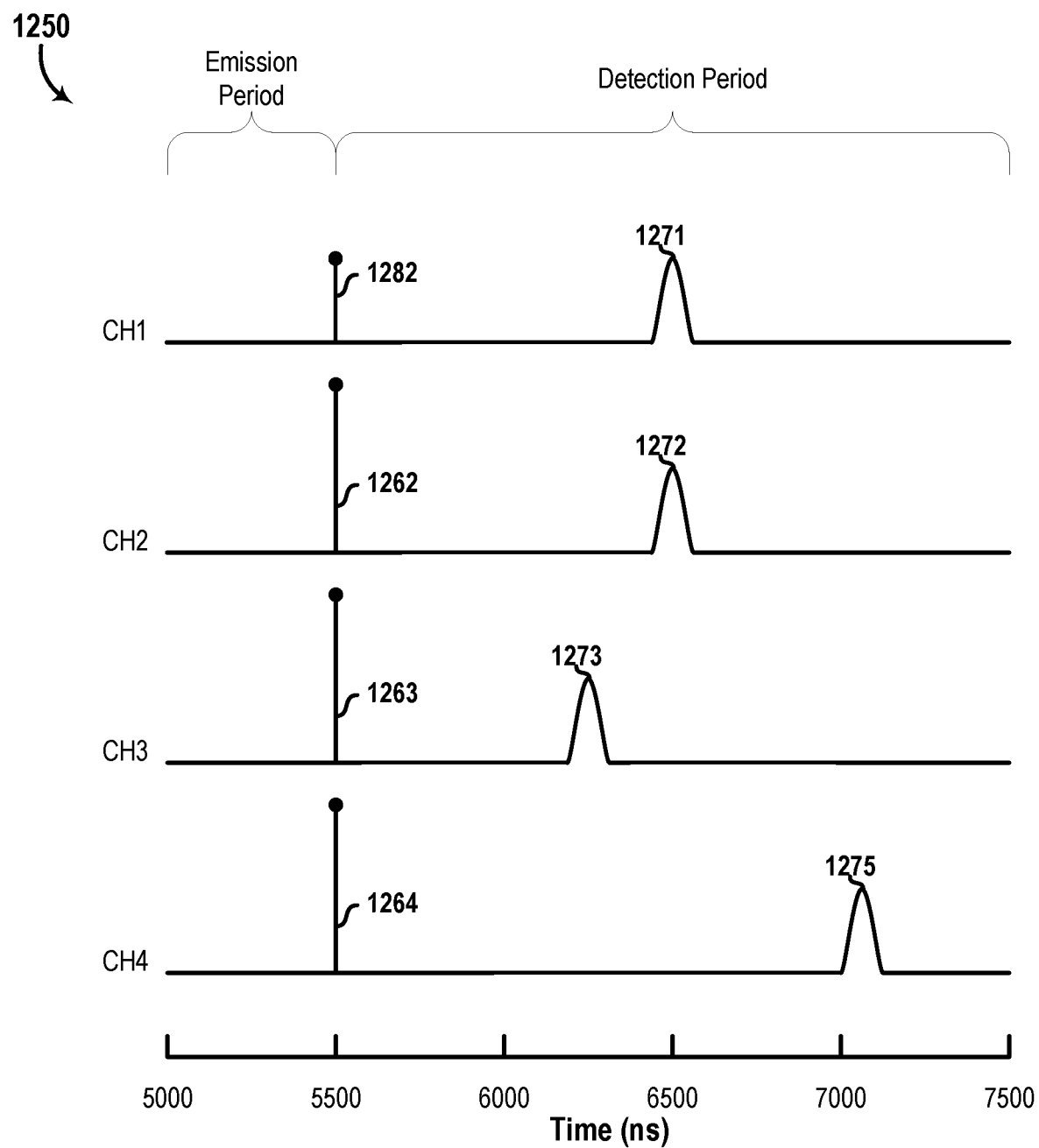
FIG. 12B illustrates conceptual timing diagrams for a second scan in the other sequence of scans, according to example embodiments.

FIG. 12B conceptual timing diagrams for a second scan 1250 in the other sequence of scans, according to example embodiments. The second scan 1250 may be similar to the second scan 1150 of FIG. 11.

By way of example, an example system herein may perform the first scan 1200 to determine that a retroreflector may be present in the region of the scene scanned by CH1. In this scenario, the example system may then operate, during the second scan 1260, CH1 to emit a secondary (relatively weaker) signal 1282 (at t=5500 ns) toward the retroreflector; and CH2, CH3, CH4 to emit primary (relatively stronger) signals 1262, 1263, 1264 (at t=5500 ns) to scan the other regions of the scene associated with those channels.

To that end, detected signals 1271, 1272, 1273, and 1275 may be similar, respectively, to detected signals 1171, 1172, 1173, and 1175 of the second scan 1150. For example, a system of the second scan 1250 can prevent (or reduce the likelihood of) spurious detections in CH2 and CH3 by illuminating the retroreflector (of CH1 using the (weaker) secondary signal 1282 (as compared to the stronger primary signals 1262, 1263, 1264 of the other channels).

Figure 13:
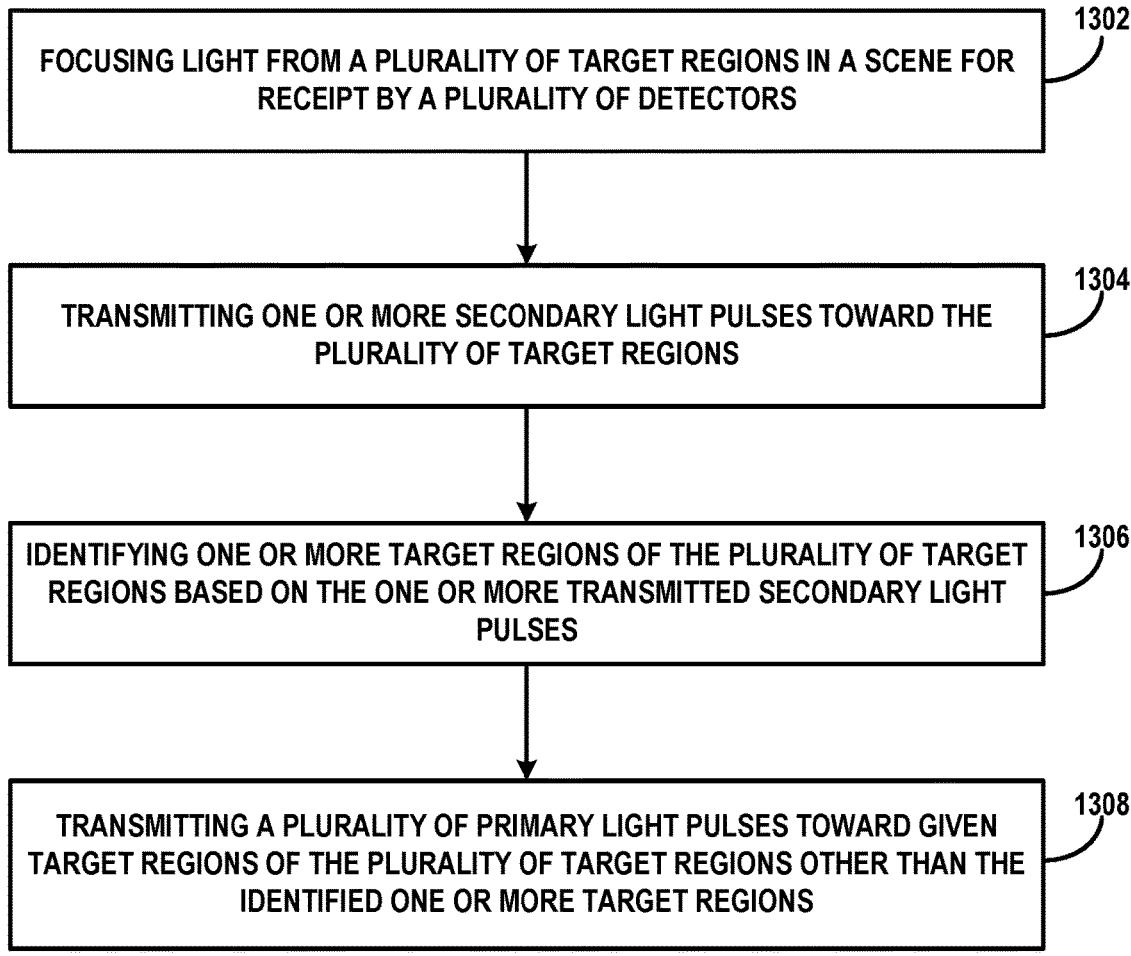
FIG. 13 is a flowchart of yet another method, according to example embodiments.

FIG. 13 is a flowchart of yet another method 1300, according to example embodiments. Method 1300 presents an embodiment of a method that could be used with any of system 100, devices 200-500, method 600 and/or method 800, for example. Method 1300 may include one or more operations, functions, or actions as illustrated by one or more of blocks 1302-1308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1302, method 1300 involves focusing light from a plurality of target regions in a scene for receipt by a plurality of detectors. Referring back to FIG. 3A for example, transmit lens 340 may focus light from the scene toward the plurality of detectors (not shown) inside housing 350. As shown in FIG. 3B for example, each detector may be arranged to intercept a respective portion of the focused light which includes light from a respective target region illuminated by a respective emitted primary beam (e.g., small circles in FIG. 3B), exemplified by primary beams 361-366. To that end, in some examples, block 1302 may be similar to block 604 of method 600 and block 802 of method 800.

At block 1304, method 1300 involves transmitting one or more secondary light pulses toward the plurality of target regions. In some examples, the secondary light pulse(s) of block 1304 may be similar to the secondary light pulse described at block 808 of method 800 and/or the secondary signals described at block 602.

In a first example, transmitting the secondary light pulse(s) at block 1304 may involve transmitting a secondary light pulse that illuminates all the plurality of target regions according to a secondary light intensity that is less than the secondary threshold described at block 602 of method 600 (e.g., the second light intensity may be sufficiently high for the detectors to detect retroreflectors in the scene, while being also sufficiently low for the detectors not to detect other types of reflective surfaces in the scene, etc.). For instance, in the example of LIDAR 300 (shown in FIG. 3A), the secondary light pulse at block 1304 may be emitted by a secondary emitter that is disposed outside housing 350, and respective portions of the secondary light pulse (e.g., light pulse 367 shown in FIG. 3B) may overlap with respective target regions (e.g., small circles exemplified by circles 361-366 in FIG. 3B) of the plurality of target regions.

Accordingly, in some implementations, the secondary light pulse (e.g., pulse 367 of FIG. 3B) illuminates a plurality of target regions (e.g., the target regions associated with beams 361-366, etc.), a LIDAR device of method 1300 (e.g., LIDAR 300, etc.) includes a plurality of detectors (e.g., detectors 132 of system 100, etc.), and each detector of the plurality of detectors is arranged to intercept light from a respective target region of the plurality of target regions (e.g., a first detector is arranged to intercept light from a first target region illuminated by beam 361 of FIG. 3B, a second detector is arranged to intercept light from a second target region illuminated by beam 362, and so on). Additionally, in these implementations, method 1300 may involve obtaining, via the plurality of detectors, measurements of light received by the plurality of detectors during a first detection period that begins after emission of the secondary light pulse. Referring back to FIG. 9A for example, the four detectors associated with CH1, CH2, CH3, and CH4 may each obtain measurements of light from their respective target regions during the first detection period (e.g., between t=500 ns and t=2500 ns).

In a second example, transmitting the secondary light pulse(s) at block 1304 may involve transmitting a plurality of secondary light pulses, where each light pulse illuminates a respective target region of the plurality of target regions according to the (relatively lower) light intensities that are less than the secondary threshold. Referring back to FIG. 7 for example, each of the CH1-CH4 may transmit a separate secondary light pulse (e.g., signals 781-784) that have a lower intensity/power as compared to the primary light pulses (e.g., signals 761-764) transmitted by CH1-CH4.

At block 1306, method 1300 involves identifying one or more target regions of the plurality of target regions based on the one or more transmitted secondary light pulses. Referring back to FIG. 9A for example, the target region scanned by CH1 can be identified as a target region where a retroreflector is likely to be present; and the target regions scanned by CH2, CH3, and CH4 may be identified as target regions where retroreflectors are unlikely to be present.

At block 1308, method 1300 involves transmitting a plurality of primary light pulses toward given target regions of the plurality of target regions other than the identified one or more target regions. In some examples, transmitting the primary light pulses at block 1308 may be similar to emitting the primary light pulse described at block 804 of method 800 and/or transmitting the primary signals described at block 602 of method 600. For example, each primary light pulse may be emitted toward a respective target region aligned with a respective detector of the plurality of detectors.

Referring back to FIG. 10 for example, the given target regions scanned by CH2, CH3, and CH4 may be illuminated by primary light pulses (e.g., having at least the primary light intensity, etc.) that are triggered by transmit signals 1062, 1063, and 1064 during the second scan 1050 (e.g., which is subsequent to the first scan 900 where CH1 was identified as being associated with a target region that includes a retroreflector, etc.). Referring back to FIG. 3B for instance, LIDAR 300 (e.g., during the second scan 1050) may be configured to transmit a plurality of primary beams (e.g., represented by small circles) in the directions shown for beams 362-366, etc., without emitting a primary beam in the direction shown for beam 361 (e.g., where a retroreflector may be present).

In some examples, method 1300 involves transmitting, subsequent to transmitting the one or more secondary light pulses of block 1304, one or more additional secondary light pulses toward the identified one or more target regions of block 1306.

In one example, a secondary light pulse can be emitted by a secondary emitter to illuminate all the one or more identified target regions (e.g., signal 1182 of FIG. 11). In another example, one or more secondary light pulses can be emitted by respective emitters arranged to illuminate the one or more identified target regions (e.g., secondary light pulse 1282 of FIG. 12B).

In some implementations, a device or system herein may be configured to emit a sequence of signals, including one or more primary signals and one or more secondary signals in a predetermined relative order, to illuminate a target region. In these implementations, after emitting the sequence of signals, the device or system may then receive one or more signals from the target region, and determine information about the target region based on a comparison of the emitted sequence of signals and the received one or more signals.

Figure 14:
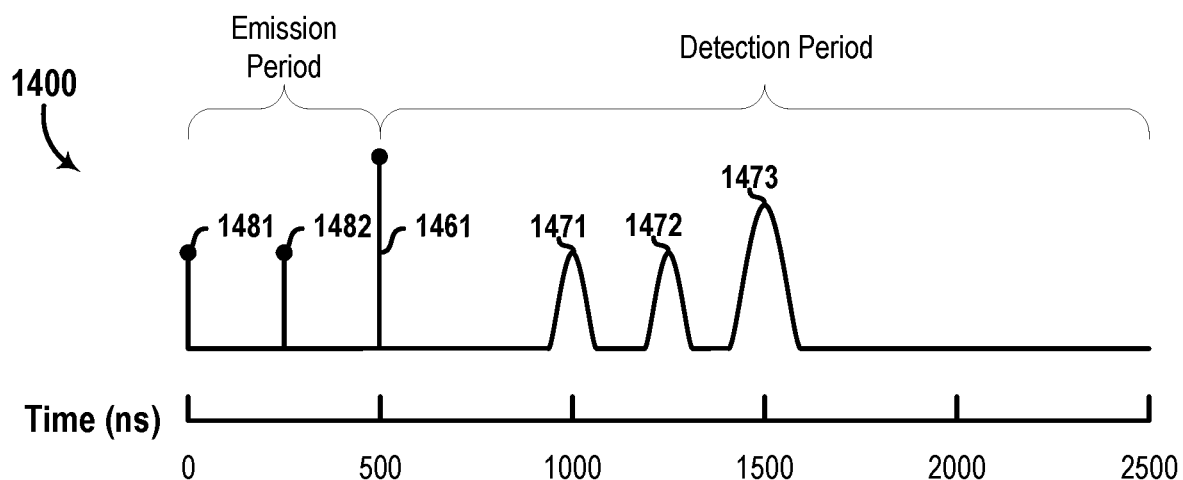
FIG. 14 illustrates a conceptual timing diagram for a first scan of a target region by an active sensor that emits a sequence of signals, according to example embodiments.

FIG. 14 illustrates a conceptual timing diagram for a first scan 1400 of a target region by an active sensor that emits a sequence of signals, according to example embodiments. For example, scan 1400 may be performed by any of system 100 and/or LIDARs 200-500.

In some examples, a device or system herein may be configured to obtain a sequence of scans of a scene periodically or intermittently, where each scan includes an emission period followed by a detection period. For instance, in the scenario shown, each scan of the sequence may include an emission period of 500 ns, followed by a detection period of 2000 ns.

In some examples, the device or system may emit a sequence of one or more primary pulses and one or more secondary pulses in a predetermined relative order (e.g., to illuminate a target region in a scene). For example, in the scenario shown, the device or system may transmit a first secondary pulse 1481 at t=0 ns, a second secondary pulse at t=250 ns, and a primary pulse 1461 at t=500 ns.

In some examples, secondary pulses 1481 and 1482 may be similar to any of secondary pulses 781-784 described in FIG. 7 and/or secondary pulse 981 described in FIG. 9A. For instance, secondary pulses 1481 and 1482 may illuminate a target region according to a secondary intensity that is less than a first intensity of primary pulse 1461. In a first example, similarly to secondary pulse 981, secondary pulses 1481 and 1482 may be emitted by a secondary emitter (e.g., secondary emitter 324 shown in FIG. 3A, secondary emitters 524 and/or 526 shown in FIG. 5, etc.) different than a primary emitter that emits primary pulse 1461. In a second example, similarly to secondary pulses 781-784, secondary pulses 1481 and 1482 may be emitted by the same emitter that emits primary pulse 1461 (but with a relatively lower intensity).

In the scenario shown, the device or system performing scan 1400 may detect light pulses 1471 (at t=1000 ns), 1472 (at t=1250 ns), and 1173 (at t=1500 ns) from the target region illuminated by transmitted pulses 1481, 1482, 1461.

In this scenario, the device or system may determine an object is present in the target region illuminated by the sequence of signals 1481, 1482, 1461, and that the object is within a threshold distance to the LIDAR device. For example, the threshold distance may be a maximum scanning range (e.g., 300 meters) associated with the detection period of scan 1400.

Further, the device or system may match each of the detected light pulses 1471-1473 with a corresponding emitted light pulse of the emitted sequence based on the emission times of the emitted light pulses and the detection times of the detected light pulses. For example, in the scenario shown, three light pulses are emitted (1481, 1482, and 1461), and three light pulses are detected (1471, 1472, 1473). Further, the difference between the emission times of pulses 1481 and 1482 is 250 ns, and the difference between emission time pulses 1482 and 1461 is 250 ns. Similarly, the difference between detection times of pulses 1471 and 1472 is 250 ns, and the difference between the detection times of pulses 1472 and 1473 is 250 ns.

Thus, in this scenario, an example device or system herein may also determine that the object is a retroreflector that is at a distance of approximately (d≈c/2*(1500−500)=150 meters) from the device or system. For instance, a retroreflector at that distance (e.g., 150 meters) may be expected to reflect a sufficient amount of power for detection by the example device or system (e.g., detected light pulses 1471, 1472 may have at least a threshold intensity that is detectable by the LIDAR, etc.).

Thus, in some examples, by emitting a coded sequence of secondary and primary light pulses for instance, a system or device herein can detect an object in the target region as well as classify the object as a retroreflector.

However, in some scenarios, reflected portions of the secondary light pulses (e.g., detected pulses 1471, 1472) off an object that is not a retroflector may still be detected by the LIDAR. For instance, a nearby object (e.g., 10-20 meters away from the LIDAR, etc.) may reflect a sufficient amount of power from the secondary light pulses 1481, 1482 for detection by the LIDAR. Similarly, in some scenarios, reflected portions of the secondary light pulses from a distant retroreflector (e.g., 300 meters away) might not be detectable even though a reflected portion of the primary light pulse from the retroreflector is detectable. Thus, in some examples, an example device or system herein may be configured to distinguish between detected reflections of an emitted primary light pulse from detected reflections of an emitted secondary light pulse further based at least in part on respective intensities and/or receipt times of the detected light pulses.

To that end, in some implementations, a method herein may optionally involve determining whether a particular detected light pulse (e.g., pulses 1471, 1472, etc.) corresponds to a reflection of an emitted secondary light pulse (and/or a reflection of an emitted primary light pulse) based on at least an intensity and/or a receipt time of the particular detected light pulse.

In one implementation, an example device or system herein may be configured to compare the intensity (or power density) of the particular detected light pulse with one or more variable thresholds associated with one or more ranges of distances to the device or system (and/or one or more ranges of pulse detection times within the detection period of the scan). For instance, the example system or device could determine whether the particular detected light pulse is a reflection of a primary light pulse (e.g., reflected by a distant retroreflector) or a reflection of a secondary light pulse (e.g., reflected by a nearby object) by comparing the detected intensity (or power density) of the particular detected light pulse with: a first (relatively higher) threshold if the particular detected light pulse was received between t=500 ns and t=600 ns, or a second (relatively lower) threshold if the particular detected light pulse was received between t=600 ns and t=700 ns, etc. Alternatively, for instance, the system or device may be configured to compute a variable threshold that varies according to the distance between a reflecting object and the LIDAR (e.g., a variable threshold that is based on receipt time of the detected light pulse, etc.); and then compare the intensity of the particular detected light pulse with the computed variable threshold. Other implementations are possible.

Accordingly, in some examples, a method herein may involve identifying a detected light pulse as a reflection of a primary light pulse (or as a reflection of a secondary light pulse) emitted by a LIDAR device, associating one or more detected light pulses with presence of an object at a particular distance from the LIDAR device, and/or determining whether the object is a retroreflector. Additionally, in these examples, the identifying, associating, and/or determining may be based on: detection times of the detected light pulses, emission times of the emitted light pulses, and/or measured intensities (or power densities) of the detected light pulses, among other possible factors.

Figure 15:
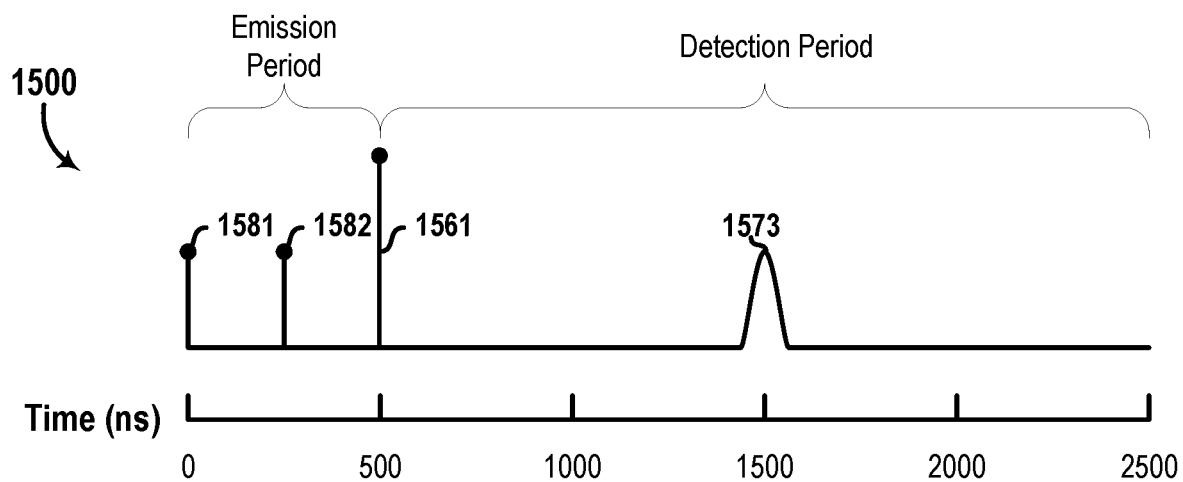
FIG. 15 illustrates a conceptual timing diagram for a second scan by an active sensor that emits a sequence of signals, according to example embodiments.

FIG. 15 illustrates a conceptual timing diagram for a second scan 1500 by an active sensor that emits a sequence of signals, according to example embodiments. Scan 1500 may be similar to scan 1400. For example, the sequence of emitted pulses/signals 1581, 1582, and 1561 may be similar to the sequence of emitted pulses/signals 1481, 1482, and 1461. Further, for example, detected pulse 1573 may be similar to detected pulse 1473.

In the scenario of FIG. 15, only a single light pulse 1573 may be detected in the detection period. Thus, in this scenario for instance, an example system or device herein may determine that the single detected signal 1573 indicates receipt of a reflection of primary emitted pulse 1561 from the target region, and that the object that reflected the detected light pulse is not a retroreflector (because no reflections of emitted secondary pulses 1581 and 1582 were detected).

Figure 16:
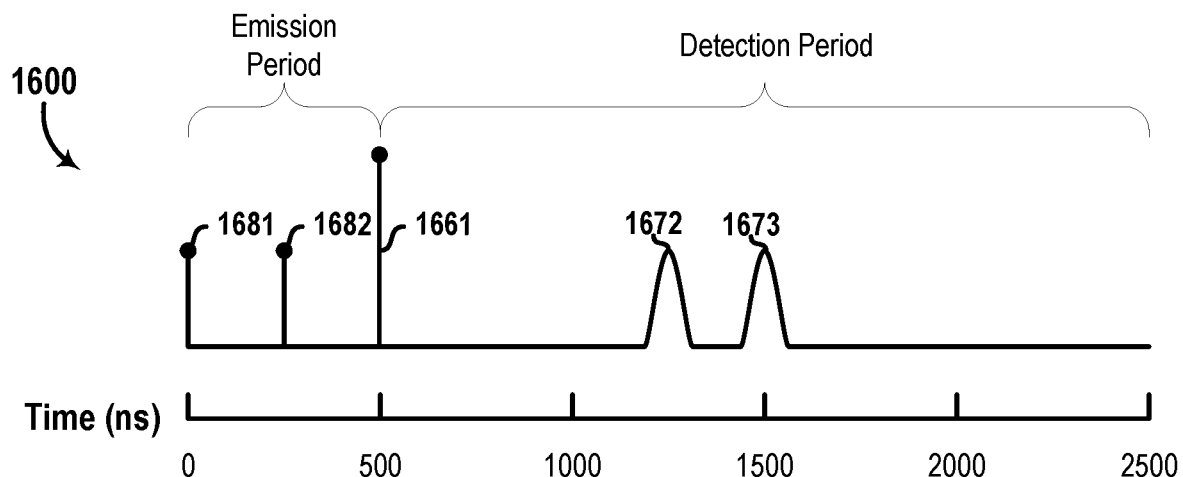
FIG. 16 illustrates a conceptual timing diagram for a third scan by an active sensor that emits a sequence of signals, according to example embodiments.

FIG. 16 illustrates a conceptual timing diagram for a third scan 1600 by an active sensor that emits a sequence of signals, according to example embodiments. Scan 1600 may be similar to scan 1400. For example, the sequence of emitted pulses/signals 1681 (secondary pulse), 1682 (secondary pulse), and 1661 (primary pulse) may be similar to the sequence of emitted pulses/signals 1481, 1482, and 1461.

In the scenario of FIG. 16, two light pulses 1672 and 1673 are detected after emission of the sequence of light pulses 1681, 1682, 1661. Thus, in this scenario for instance, an example system or device herein may determine that one or both of the detected light pulses is an invalid signal based on at least a mismatch between the number (and/or emission times) of the emitted pulses 1681, 1682, and 1661 as compared to the number (and/or detection times) of the detected pulses 1672 and 1673.

However, in line with the discussion in the description of FIG. 7, the mismatch between the numbers and/or emission/receipt times may not necessarily indicate that one or moth of the detected light pulses is an invalid signal. For instance, the mismatch may result from multiple reflections of the same transmit signal 1661 off multiple objects in the scene. Accordingly, in some examples, the system may be configured to confirm whether one or both of the detected light pulses is an invalid signal further based on one or more other indications of scanning errors associated with the presence of a retroreflector (e.g., saturation, blooming, etc.).

Figure 17:
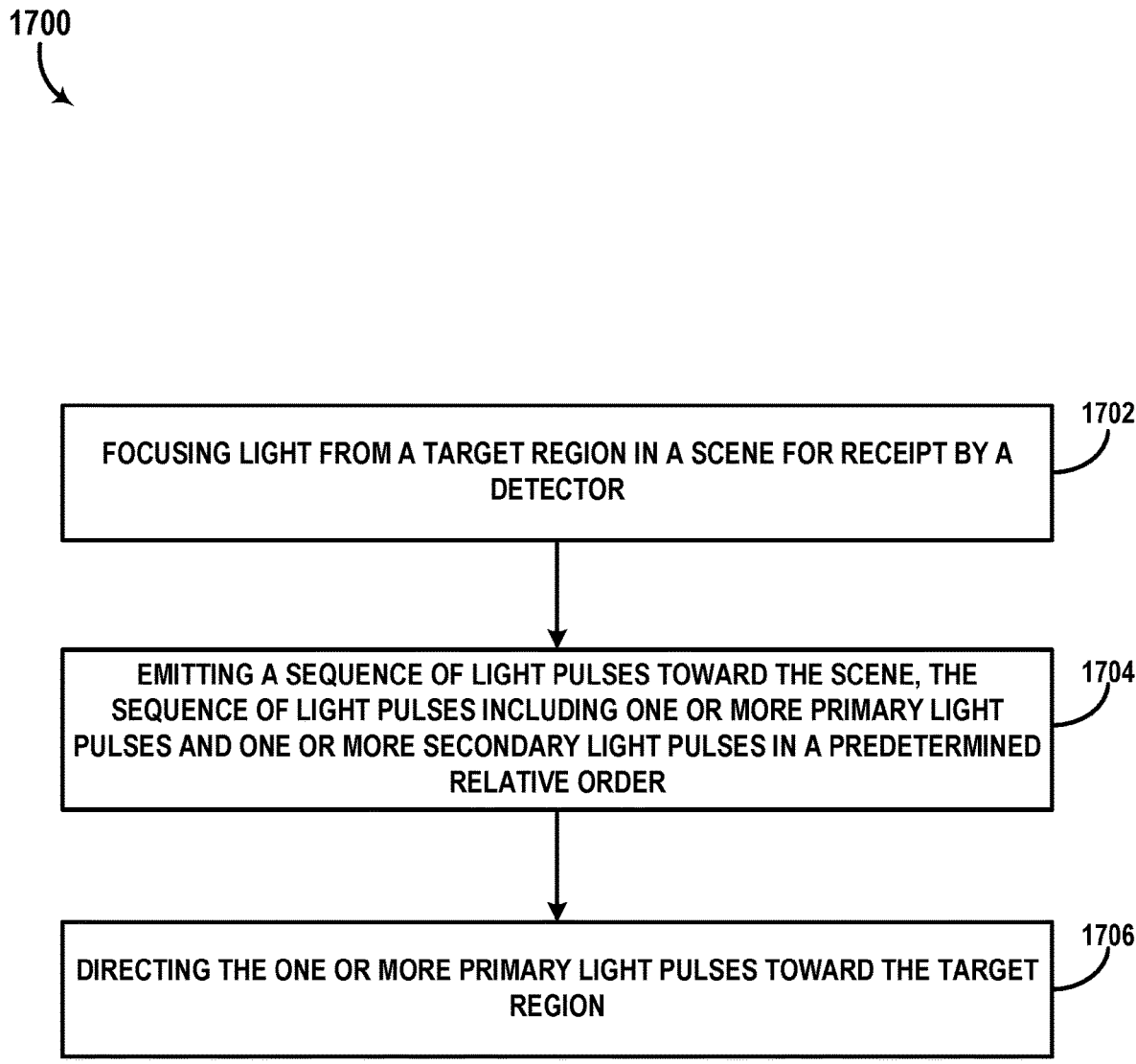
FIG. 17 is a flowchart of yet another method, according to example embodiments.

FIG. 17 is a flowchart of yet another method 1700, according to example embodiments. Method 1700 presents an embodiment of a method that could be used with any of system 100, devices 200-500, and/or methods 600, 800, 1300, for example. Method 1700 may include one or more operations, functions, or actions as illustrated by one or more of blocks 1702-1706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1702, method 1700 involves focusing light from a target region in a scene for receipt by a detector. For example, block 1702 may be similar to block 802 of method 800.

At block 1704, method 1700 involves emitting a sequence of light pulses toward the scene. The sequence of light pulses includes one or more primary light pulses and one or more secondary light pulses in a predetermined order. Referring back to FIG. 14 for example, the emitted sequence of light pulses may include two secondary light pulses 1481, 1482, followed by one primary light pulse 1461.

In alternate examples, different combinations and/or numbers of primary and/or secondary light pulses are possible. In a first example, a system of method 1700 may emit one or more secondary light pulses after emitting a primary light pulse. Referring back to FIG. 14 for instance, secondary light pulse 1481 can be alternatively emitted at t=500 ns; and primary light pulse 1461 can be alternatively emitted at t=0 ns (and/or t=250 ns). In a second example, the sequence of light pulses may include a different number of primary pulse(s) and/or a different number of secondary pulse(s) (e.g., one primary pulse, and three secondary pulses; two primary pulses, and one secondary pulse; etc.). In a third example, the primary and/or secondary light pulse(s) can be emitted in a different order (e.g., primary, secondary, secondary; secondary, primary, secondary; etc.). In a fourth example, the time offsets between emission of two or more light pulses may vary. Referring back to FIG. 14 for instance, secondary light pulse 1482 can be alternatively emitted at t=400 ns (i.e., 500−400=100 ns prior to emission of primary pulse 1461, and 400−0=400 ns after emission of secondary pulse 1481). Other examples are possible.

In some examples, the primary light pulse(s) at block 1704 may be similar to the primary light pulse described at block 804 of method 800. For example, each primary light pulse in the emitted sequence may illuminate the target region (e.g., the region between arrows 560a and 560b shown in FIG. 5) according to at least a primary light intensity (e.g., greater than the primary threshold described at block 602 of method 600, etc.). Further, in some examples, at least a portion of each secondary light pulse (e.g., portion of secondary light pulse 580 of FIG. 5) in the emitted sequence may illuminate the same target region according to a secondary light intensity that is less than the primary light intensity.

At block 1706, method 1700 involves directing the one or more primary light pulses toward the target region. For example, block 1706 may be similar to block 806 of method 800. Referring back to FIG. 5 for instance, the primary pulse(s) may be directed via transmit lens 540 and mirror 544 in the direction shown by arrow 560 (e.g., and may each have a beam divergence that extends between arrows 560a and 560b, etc.).

In some examples, method 1700 may involve detecting, via the detector, one or more detected light pulses in the focused light from the target region. In these examples, method 1700 may also optionally involve determining that an object is present in the target region within a threshold distance to the LIDAR device based on at least emission times of the emitted sequence of light pulses and detection times of the one or more detected light pulses.

Referring back to FIG. 14 for example, a system or device of method 1700 may compare the emission times of the emitted sequence of pulses 1481, 1482, 1461 with the detection times of the detected light pulses 1471, 1472, 1473 to determine that an object is within the threshold distance (e.g., scanning range of 300 meters associated with the detection period of 2000 ns, etc.).

In some examples, method 1700 may involve identifying the object as a retroreflector based on the one or more detected light pulses including reflected portions of the one or more secondary light pulses. Referring back to FIG. 14 for example, an example system or device herein may determine that detected pulses 1471 and 1472 represent reflections of emitted secondary pulses 1481 and 1482, and may thus determine that the object in the target region illuminated by the emitted sequence of pulses is a retroreflector.

In some examples, method 1700 may involve estimating a distance between a LIDAR device of method 1700 and the object in the target region based on at least the predetermined relative order. Referring back to FIG. 15 for example, detected pulse 1573 may be identified as a reflection of primary pulse 1561 due to the absence of other detected signals before detected signal 1573. Further, based on the order of emitted pulses 1581, 1582, 1561, the distance between the object and the LIDAR device can be computed based on the difference between the emission time of primary pulse 1561 and the detection time of detected pulse 1573 (e.g., 150 meters).

In some examples, method 1700 may also involve determining that a particular light pulse of the one or more detected light pulses does not correspond to a reflected portion of at least one of the emitted sequence of light pulses. Referring back to FIG. 16 for example, detected pulses 1672 and/or 1673 may be determined to correspond to an invalid signal due to a mismatch between the (three) emitted signals 1681, 1682, 1661 and the (two) detected signals 1672 and 1673. As another example, referring back to FIG. 7, an example device or system herein may determine that one or both of detected signals 771*b* and 772 (of CH2) is an invalid signal due to a mismatch between emission times of emitted sequence of signals 782, 762 and detection times of detected signals 772, 771*b*.

In some examples, the sequence of light pulses emitted at block 1704 is a first sequence of light pulses. In these examples, method 1700 may also optionally involve emitting a second sequence of light pulses after emitting the first sequence of light pulses (and/or after detecting the one or more detected light pulses). For instance, the first sequence of light pulses may be emitted during a first emission period (e.g., between t=0 ns and t=500 ns, etc.) of a first scan; and the second sequence of light pulses may be emitted during a second emission period (e.g., between at t=5000 ns and t=5500 ns, etc.) of a second subsequent scan.

In these examples, method 1700 may optionally involve emitting the second sequence of light pulses according to second time offset(s) between the emitted second sequence of light pulses different than first time offset(s) between the emitted first sequence of light pulses. Referring back to FIG. 14 for example, during a first scan, a LIDAR may emit light pulses 1481, 1482, and 1461 in the order and times shown in FIG. 14. In this example, during a second scan subsequent to the first scan, the LIDAR may emit two secondary pulses (e.g., similar to pulses 1481 and 1482) followed by a primary pulse (e.g., similar to pulse 1461). However, during the second scan, the LIDAR may adjust the second time offsets between the second sequence of light pulses as compared to the first time offsets used between the first sequence of light pulses (e.g., first sequence emission times: t=0 ns, t=250 ns, t=500 ns; and second sequence emission times: t=0 ns, t=100 ns, t=500 ns; etc.). In this way, for instance, reflections of the first sequence of light pulses from distant targets (e.g., retroreflectors, etc.) that are detected by the LIDAR during a second detection period of the second scan can be distinguished from reflections of the second sequence of light pulses that are detected during the second detection period (e.g., based on the difference between the first time offsets and the second time offsets). Additionally or alternatively, for instance, varying the second time offsets of the second scan (from the first time offsets of the first scan) may facilitate disambiguating between: (i) detected light pulses that were reflected off an individual target object in the scene and (ii) detected light pulses that were reflected off two or more separate target objects which happen to be coincidentally separated by a distance that matches the first time offsets.

Alternatively or additionally, in some examples, method 1700 may optionally involve emitting the second sequence of light pulses according to a second relative order different than a first relative order of the first sequence of light pulses. Continuing with the scenario of FIG. 14 for instance, the first sequence of light pulses may be emitted in the first relative order shown (i.e., secondary pulse 1481, then secondary pulse 1482, then primary pulse 1461); and the second sequence of light pulses may be emitted in a second (different) relative order (e.g., secondary light pulse, then primary light pulse, then secondary light pulse; etc.). Other examples are possible.

It is noted that the emission periods (e.g., 500 ns) and detection periods (e.g., 2000 ns) in the conceptual illustrations of FIGS. 7, 9A-9B, 10-11, 12A-12B, and 14-16 are only exemplary. Other emission periods (e.g., 100 ns, 200 ns, etc.) and/or detection periods are possible (e.g., 1000 ns, 3000 ns, 5000 ns, etc.).

Additionally, it is noted that the conceptual illustrations of FIGS. 7, 9A-9B, 10-11, 12A-12B, and 14-16 show respective emission periods that are temporally separate from respective (subsequent) detection periods only for the sake of example. Alternatively or additionally, in some examples, a system or device of the present disclosure may be configured to emit light pulses during an emission period that at least partially overlaps an associated detection period. Referring back to FIG. 16 by way of example, a LIDAR that performs scan 1600 may alternatively have an emission period from t=0 ns to t=750 ns (and the detection period is from t=500 ns to t=2500 ns). Further, in this example, the LIDAR may emit one or more light pulses (e.g., primary and/or secondary) between t=500 ns and t=750 ns (i.e., while simultaneously listening for reflections of light pulses 1681, 1682, and/or 1661). Alternatively, in another example, the entire emission period of a particular scan may temporally overlap the detection period of the particular scan (e.g., both the emission period and the detection period of scan 1600 of FIG. 16 could alternatively begin at t=0 ns).

Accordingly, in some examples, method 1700 optionally involves detecting one or more detected light pulses (e.g., that correspond to reflections of one or more of the sequence of light pulses emitted at block 1704) during a detection time period; and emitting the sequence of light pulses at block 1704 during an emission time period that at least partially overlaps the detection time period.

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method comprising:
    focusing, by a light detection and ranging (LIDAR) device, light from a plurality of target regions in a scene for receipt by at least one detector; and
    transmitting a plurality of light pulses toward the scene, wherein transmitting the plurality of light pulses comprises:
        emitting, by a plurality of primary emitters, a plurality of primary light pulses,
        directing, via one or more optical elements, the primary light pulses toward the plurality of target regions, wherein each primary light pulse of the plurality of primary light pulses illuminates a respective target region of the plurality of target regions according to a primary light intensity,
        emitting, by a secondary emitter, a secondary light pulse, wherein respective portion of the secondary light pulse illuminates each target region of the plurality of target regions according to a secondary light intensity, and wherein the secondary light intensity is less than the primary light intensity,
        detecting a retroreflector based on the at least one detector indicating detection of a reflected portion of the secondary light pulse in the focused light, and
        in response to detecting the retroreflector, controlling at least one primary emitter of the plurality of primary emitters to avoid illuminating the retroreflector.

2. The method of claim 1, further comprising:
    detecting an object in a particular target region based on the at least one detector indicating detection of a reflected portion of a primary light pulse directed toward the particular target region.

3. The method of claim 2, further comprising:
    identifying a reflectivity characteristic of the object based on a determination of whether a reflection of the secondary light pulse reflected off the object is detected by the at least one detector.

4. The method of claim 1, wherein transmitting the plurality of light pulses comprises:
    transmitting each primary light pulse toward the scene as a corresponding primary light beam having a first beam divergence; and
    transmitting the secondary light pulse toward the scene as a secondary light beam having a second beam divergence that is greater than the first beam divergence.

5. The method of claim 4, wherein transmitting each primary light pulse toward the scene as the corresponding primary light beam having the first beam divergence comprises:
    collimating, via the one or more optical elements, each primary light pulse.

6. The method of claim 1, further comprising:
    transmitting a primary light pulse along a first optical path that includes the one or more optical elements; and
    transmitting the secondary light pulse along a second optical path that does not include the one or more optical elements.

7. The method of claim 1, wherein transmitting the plurality of light pulses comprises emitting the secondary light pulse prior to emitting the plurality of primary light pulses.

8. The method of claim 1, wherein transmitting the plurality of light pulses comprises:
    illuminating a particular target region by emitting a sequence of light pulses including one or more primary light pulses and one or more secondary light pulses in a predetermined relative order.

9. The method of claim 8, further comprising:
    detecting, via the at least one detector, one or more detected light pulses in the focused light from the particular target region; and
    based on at least emission times of the emitted sequence of light pulses and detection times of the one or more detected light pulses, determining that an object is present in the particular target region within a threshold distance to the LIDAR device.

10. The method of claim 9, further comprising:
    based on at least the predetermined relative order, estimating a distance between the LIDAR device and the object in the particular target region.

11. The method of claim 9, further comprising:
    based on at least the predetermined relative order, identifying the object as a retroreflector.

12. The method of claim 9, further comprising:
    based on the emission times and the detection times, determining that a particular light pulse of the one or more detected light pulses does not correspond to a reflected portion of the emitted sequence of light pulses.

13. The method of claim 1, wherein the LIDAR device includes a plurality of detectors, wherein each detector of the plurality of detectors is arranged to intercept light from a respective target region of the plurality of target regions, and wherein transmitting the plurality of light pulses comprises:
    obtaining, via the plurality of detectors, measurements of light received by the plurality of detectors during a first detection period that begins after emission of the secondary light pulse;
    identifying, based on the obtained measurements, one or more target regions of the plurality of target regions that include one or more retroreflectors; and
    wherein controlling the at least one primary emitter to avoid illuminating the retroreflector comprises during an emission period that begins after the first detection period, emitting, by remaining primary emitters of the plurality of primary emitters other than the at least one primary emitter, primary light pulses toward remaining target regions of the plurality of target regions other than the identified one or more target regions.

14. A light detection and ranging (LIDAR) device comprising:
    at least one detector arranged to intercept light, focused by the LIDAR device, from a plurality of target regions in a scene;
    a plurality of primary emitters configured to emit a plurality of primary light pulses;
    one or more optical elements arranged to direct the primary light pulses toward the plurality of target regions, wherein each primary light pulse of the plurality of primary light pulses illuminates a respective target region of the plurality of target regions according to a primary light intensity;

a secondary emitter configured to emit a secondary light pulse, wherein a respective portion of the secondary light pulse illuminates each target region of the plurality of target regions according to a secondary light intensity, and wherein the secondary light intensity is less than the primary light intensity; and a controller coupled to the detector, the plurality of primary emitters, and the secondary emitter, wherein the controller is configured to (i) detect a retroreflector based on the at least one detector detecting light corresponding to a reflected portion of the secondary light pulse and (ii) in response to detecting the retroreflector, controlling at least one primary emitter of the plurality of primary emitters to avoid illuminating the retroreflector.

15. The LIDAR device of claim 14, wherein the plurality of primary emitters and the one or more optical elements are disposed inside a housing, and wherein the secondary emitter is disposed outside the housing.

16. The LIDAR device of claim 14, wherein each primary light pulse has a first beam divergence, wherein the secondary light pulse has a second beam divergence, and wherein the second beam divergence is greater than the first beam divergence.

17. The LIDAR device of claim 14, wherein the primary light pulses are transmitted along a first optical path that includes the one or more optical elements, wherein the secondary light pulse is transmitted along a second optical path that does not include the one or more optical elements.

18. The LIDAR device of claim 14, wherein the controller is configured to control the plurality of primary emitters and the secondary emitter such that the secondary emitter emits the secondary light pulse prior to the plurality of primary emitters emitting the plurality of primary light pulses.

19. The LIDAR device of claim 14, wherein the at least one detector includes a plurality of detectors, wherein each detector of the plurality of detectors is arranged to intercept light from a respective target region of the plurality of target regions, and wherein the controller is configured to:

obtain, via the plurality of detectors, measurements of light received by the plurality of detectors during a first detection period that begins after emission of the secondary light pulse; and identify, based on the obtained measurements, one or more target regions of the plurality of target regions that include one or more retroreflectors.

20. The LIDAR device of claim 19, wherein controlling the at least one primary emitter to avoid illuminating the retroreflector comprises:

during an emission period that begins after the first detection period, controlling the plurality of primary emitters such that remaining primary emitters of the plurality of primary emitters other than the at least one primary emitter emit primary light pulses toward remaining target regions of the plurality of target regions other than the identified one or more target regions.

* * * * *